(12) United States Patent
Brentnall, III et al.

(10) Patent No.: US 7,938,540 B2
(45) Date of Patent: May 10, 2011

(54) AUTOSTEREOSCOPIC PROJECTION SYSTEM

(75) Inventors: Thomas E. Brentnall, III, Cypress, CA (US); Richard B. Turner, Valencia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 345 days.

(21) Appl. No.: 12/176,947

(22) Filed: Jul. 21, 2008

(65) Prior Publication Data

US 2010/0014053 A1  Jan. 21, 2010

(51) Int. Cl.
*G03B 21/00* (2006.01)

(52) U.S. Cl. .................. 353/7; 359/462; 348/51
(58) Field of Classification Search ...... 353/7; 359/462; 348/51
See application file for complete search history.

(56) References Cited

U.S. PATENT DOCUMENTS

| | | | |
|---|---|---|---|
| 5,337,096 A | 8/1994 | Qu et al. | |
| 5,671,992 A | 9/1997 | Richards | |
| 5,703,717 A * | 12/1997 | Ezra et al. | 359/462 |
| 5,712,732 A | 1/1998 | Street | |
| 5,793,470 A | 8/1998 | Haseltine et al. | |
| 6,147,805 A | 11/2000 | Fergason | |
| 6,163,336 A | 12/2000 | Richards | |
| 6,473,115 B1 | 10/2002 | Harman | |
| 6,543,899 B2 | 4/2003 | Covannon et al. | |
| 6,829,089 B2 | 12/2004 | Agostinelli et al. | |
| 7,136,090 B1 | 11/2006 | McDuffie White | |
| 7,224,526 B2 | 5/2007 | Putilin et al. | |
| 2002/0191841 A1 | 12/2002 | Harman | |
| 2004/0135744 A1 | 7/2004 | Bimber et al. | |
| 2005/0117016 A1 | 6/2005 | Surman | |
| 2005/0185711 A1 | 8/2005 | Pfister et al. | |
| 2007/0201004 A1 | 8/2007 | O'Connell et al. | |

FOREIGN PATENT DOCUMENTS

GB  2437928  11/2007

OTHER PUBLICATIONS

Bimber, Oliver, et al., "Alternative Augmented Reality Approaches: Concepts, Techniques,and Applications" Eurographics 2003.
Bimber, Oliver, "Interactive Rendering for Projection-Based Augmented Reality Displays," Accepted by the Department of Computer Science in partial fulfillment of the requirements for the degree of Doktor-Ingenieurs (Dr.-Ing.) at the Technische Universitat, Darmstadter Dissertation Sep. 2002.

* cited by examiner

*Primary Examiner* — Seung C Sohn
(74) *Attorney, Agent, or Firm* — Marsh Fischmann & Breyfogle LLP; Kent A. Lembke

(57) ABSTRACT

An apparatus projecting 3D autostereoscopic images viewers. The apparatus includes a projector array with projectors each receiving an input image such as digital video and projecting an image based on the input image. A beam splitter with first and second surfaces is positioned such that the projected images strike the first surface and a portion (e.g., 50 to 95 percent) is transmitted through the beam splitter toward a screen with a retroreflective surface. The retroreflective surface reflects the splitter-transmitted portion back along the same path but with increased brightness. The light reflected from the retroreflective surface strikes the second surface of the beam splitter and is reflected toward a display viewing zone provided at about the focal points of the reflected projectors. A 3D image is perceivable to a viewer who positions his eyes at or near any of two or more viewing locations proximate to the projection surface.

21 Claims, 13 Drawing Sheets

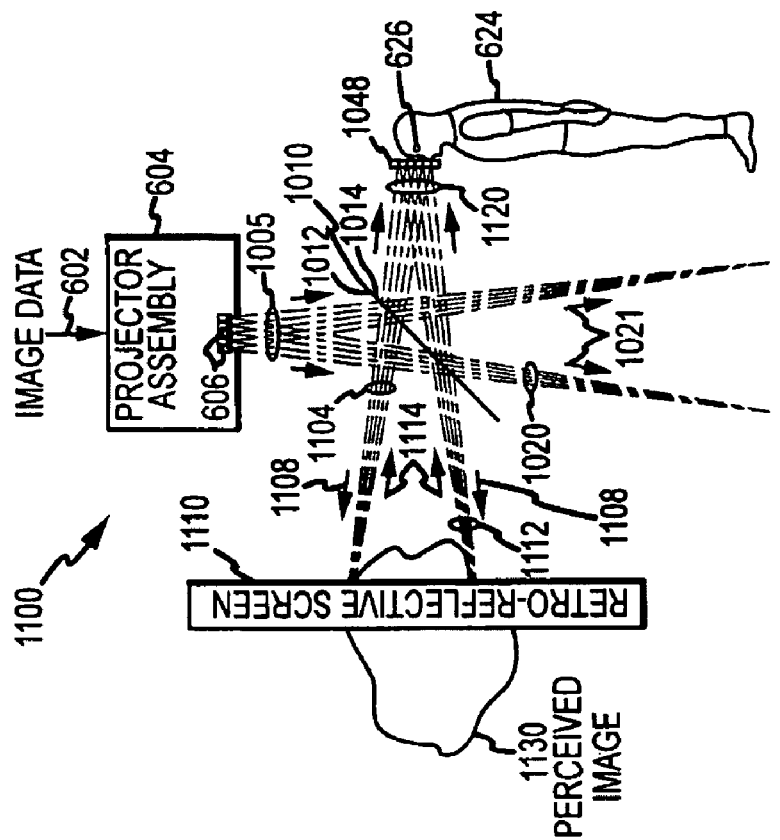

AUTOSTEREOSCOPIC PROJECTION SYSTEM

BACKGROUND OF THE INVENTION

1. Field of the Invention

The present invention relates, in general, to projecting or displaying video/animated or still three dimensional (3D) images, and, more particularly, to autostereoscopy and autostereoscopic projection systems such as those adapted to display ghost or latent 3D images without requiring accurate tracking of a viewer's right and left eye or glasses, headgear, or other equipment that has to be worn or used by a viewer.

2. Relevant Background

There are numerous entertainment and other settings where it is desirable to create a unique visual display. For example, theme or amusement parks may include rides or walk-through attractions where guests (or "viewers") are entertained by a unique visual effect or illusion. Pepper's ghost is an illusionary technique used by magicians, by ride or attraction designers, and others to produce a 3D illusion of a latent or ghost-like image. Using a simple piece of plate glass and special lighting techniques, Pepper's ghost systems can make objects appear and disappear within a scene or room. Generally, these systems include a main room or scene that is readily viewed by a guest or viewer and a hidden room that is not visible to the viewer, and both rooms may be identical in their physical structure including furniture and other objects except the hidden room may include additional objects or characters such as a ghost. A large piece of glass or a half-silvered mirror is situated between the viewer and the scene at an angle such as about 45 degrees. When the main room is lit and the hidden room is darkened, the viewer only sees the main room as the hidden room does not reflect from the glass, which is itself hard to see as it typically extends across the entire view of the main room. However, Pepper's ghost becomes very visible to the viewer when the entire hidden room or portions such as the ghost or other character are brightly lit. Since only a portion of the light cast upon the ghost or other objects in the hidden room is reflected from the glass, the reflected images appear as latent or ghostly images relative to the objects in the main room (e.g., the reflected images or images superimposed in the visible room may appear to float). The Pepper's ghost image is a 3D image that may be still or animation may be provided such as with animatronics or by placing a live actor in the hidden room.

In a broad sense, the Pepper's ghost systems may be thought of as implementing autostereoscopy, which is generally a method of displaying 3D images that can be viewed without the use of headgear or glasses on the part of the user. In many implementations, autostereoscopy is used to produce depth perception in the viewer even though the image may be produced by a flat device. For example, autostereoscopic or 3D displays may provide flat-panel display systems by using lenticular lenses or a parallax barrier. If a viewer positions his head in particular viewing positions, he perceives a different image with each eye, e.g., a right eye image and a left eye image that produces a stereo image. These displays may have multiple viewing zones allowing multiple users to view the image at the same time. These 3D display systems often have suffered from low resolution, small image size, and varying brightness as the viewer moves his head.

In some 3D projection technologies, it is essential that the left and right eyes of the viewer see only the respective left and right images of the stereoscopic image. To this end, a video is created with cameras set apart by a predefined interoccular distance (i.e., spacing between a human's right and left eye which may be about 2 to 3 inches). So, in these systems, the viewer must be positioned carefully in a known position with their right and left eyes in a particular location to receive the right and left eye images. In an attempt to allow a viewer to move while viewing 3D images, some autostereoscopic projection systems have provided various ways of maintaining the location of the display at the location of the viewer's eyes. For example, much work has been done to create techniques for tracking the location of the viewer's eyes and moving the display in response to project the left and right images to the corresponding viewer eye locations. Other techniques have required that the viewer wear headgear or eyewear that facilitates such tracking. Existing autostereocopic techniques generally teach that the 3D illusion will fail if the images are not projected at the average interoccular distance or if the proper image is not provided to the proper eye of the viewer (e.g., right eye image to viewer's right eye and left eye image to viewer's left eye)

Hence, there remains a need for improved visual display techniques and systems such as for creating or projecting 3D images. Preferably, such methods and systems would be relatively simple to implement, would not require a viewer to wear glasses or headgear, and would be useful in numerous applications including the entertainment industry (e.g., to create 3D illusions for theme parks and other settings).

SUMMARY OF THE INVENTION

The present invention addresses the above problems by providing projection systems and methods adapted for projecting or displaying 3D images without requiring a viewer to use headgear or glasses (i.e., autostereoscopic projection systems and methods). Briefly, an autostereoscopic projection system described herein may include a projection assembly that projects a plurality of images or image streams that correspond to a number of spaced apart image capture locations or views (e.g., a plurality of spaced apart camera locations that may correspond to actual cameras or to cameras used in animation software). The projected images are spaced apart at about the interoccular spacing or less (such as a range of about 0 to 3 inches). The projection system may direct the images through a beam splitter positioned at an angle (e.g., 40 to 50 degrees or the like) that transmits a portion of the image light and reflects a portion (e.g., 50 percent transmissive and 50 percent reflective or to make use of the high gain screen 95 percent transmissive and 5 percent reflective or many other combinations of these characteristics of a beam splitter). The transmitted portion of the images then strikes a retroreflective screen and is directed back to the beam splitter where a portion is reflected toward a viewing apparatus (or viewing surface/area) where the images are viewable by a user of the system (e.g., a guest of an amusement or theme park). The viewed or perceived image will be perceived as a 3D image or will produce depth perception for the viewer since the viewer's eyes are viewing differing images (e.g., images captured from a differing camera location or images associated with an appropriate point of view (POV)).

In the described embodiments, the 3D projection may be adapted to allow one or more viewers to view a large projected still or animated/moving image in high resolution and full natural color (although some embodiments may provide colorization or filtering as an added effect). The projected image may be perceived as floating in space and/or within a particular scene with one or more props or physical structures such as furniture. For example, the projected image may be a video or live camera feed (e.g., the image input or data stream) capturing a live or animated character that is moving such as to interact with physical objects in the show set or environment provided behind the beam splitter, which may be a large piece of plate glass, a sheet of Mylar™, or the like. Based on the projected image from the projectors and the transmissiveness of the beam splitter (and other design parameters) the displayed image (or perceived image) may be translucent or solid with appropriate occluding, with the viewer requiring no glasses or special filters to view the image. Embodiments of the invention may use retroreflective screen material that has very high gains such as gains of up to 1000 or more with some embodiments using material with a gain of about 1600× and has highly directional screen reflective properties (e.g., the 1600× gain material may have a 50 percent drop in gain when ½ degree off axis).

Previous autostereoscopic systems have used lenticular screens or vertical barrier strips in an attempt to get each of the viewer's eyes to see only a right or a left eye image. These systems were not widely adopted because they typically had low resolution, could only have relatively small images, and often had low and/or varying brightness such as when the viewer moved their head. Some prior systems also suffered from zones or areas of pseudo-stereo images in which the right and left eye images were reversed. Other prior devices only worked if eye location was traced accurately such that the projection system could operate to track that location to display the proper image at the corresponding eye location. In contrast, embodiments of the invention allow a user to move within a projection space or area that corresponds with virtual projector positions without concern about right or left eye location. Instead, the viewer's eyes are naturally aligned with two spaced-apart projected images reflected from the retroreflective screen and the beam splitter (in one embodiment, at least) so as to perceive a 3D image.

The projection systems and embodiments allow a show or optical illusion designer to place an image within a dimensional set or scene, with the image being bright and solid enough in quality to appear to be there in the scene (e.g., to appear less ghostly than prior devices unless that is the desired effect which can then be achieved by selecting a less reflective splitter and/or less powerful projector or by using brighter lighting on the background objects). The displayed images in the display viewing zone/area (such as a ride vehicle window, a port hole as found in a submarine/ship, a viewing window, and the like) has multiple POVs and not just a single left and right eye image, and, hence, the image does not distort by "following" the viewer as he moves, which allows the designer to interface it precisely with real objects in the scene/set in close proximity (without bleeding into these images and other problems).

The projection system allows a viewer to see around objects by moving between POVs (or to adjacent projected images corresponding with adjacent projectors in the projector array and, hence, adjacent or neighboring cameras or camera locations associated with those projectors), and, further, in some cases (e.g., when the projector array has 2 or more rows rather than just one row with multiple columns), the viewer may be able to see under and over objects by raising and lowering his viewing location within the display viewing zone/area. Further, in such multi-row embodiments since the projected images may be viewed and construed properly by either eye, the 3D properties of the displayed image (or perceived image) are retained even when the viewer tilts (or rotates) his head 90 degrees or more (in either a clockwise or counterclockwise direction) such that he is viewing images projected by projectors in differing but adjacent/neighboring rows of the projector array. Potential uses or practical implementations for the projection system include use in a walkthrough "moving diorama" show or attraction, ride-by scenes in an attraction ride such as those provided in conjunction with omnimovers or in show portions of faster rides, displays of real-time or recorded miniature vistas of interesting and/or beautiful places in 3D, attraction preview devices such as provided at movie theatres, amusement/theme parks, and other settings, construction fence peep holes to display what the finished construction may look like, submarine or ship portholes, queue line preshows or postshows to entertain guests, and arcade or home video games. Ultimately, it may be practical and desirable to outfit an entire theater with such a system to present a dramatic feature presentation without the need for glasses.

More particularly, an apparatus is provided for projecting or displaying 3D images to a viewer. The apparatus includes a projector array with a plurality (e.g., two or more) of projectors that each receive an input image (such as digital video of a still or animated/moving subject(s)) and that respond by projecting an image based on the input image (e.g., at brightness levels of several lumens up to 100 or more lumens with some embodiments using 10 to 25 lumen miniature or micro projectors). The apparatus also includes a beam splitter with first and second surfaces, and the beam splitter is positioned such that the projected images strike the first surface and transmit a portion (e.g., 50 to 95 percent) through the beam splitter. A screen with a retroreflective surface is positioned in the path of the projected images and functions to reflect the transmitted portion back along the same path (or a parallel vector) with increased brightness (e.g., a gain of up to 1000 times or more in the illumination level). The light or image reflected from the retroreflective surface strikes the second surface of the beam splitter and is reflected toward a display viewing zone (or opening) that is provided at about the focal points of the reflected images. As a result, a 3D image is perceivable behind the beam splitter to a viewer that positions his eyes at a viewing location proximate to the display viewing zone (e.g., with his eyes aligned with a pair of virtual projectors associated with the projectors of the array). The viewer may move his eyes between two or more viewing locations associated with the projection surface to view the 3D image from differing POVs (e.g., by aligning with differing pairs of the virtual projectors that each are projecting images from a differing POV or camera location).

In some embodiments, the retroreflective surface is substantially planar and is positioned at a throw distance of at least about 8 feet with a minimum 10-foot throw distance used in some embodiments. The retroreflective surface often will be oriented to be parallel to a plane containing the projection or output lenses of the projectors in the array while the beam splitter may also be planar but positioned transverse to the screen such as at a splitter angle in the range of 30 to 60 (e.g., 45 degrees or the like). The beam splitter may be formed of a material such as glass (coated or uncoated) or the like that is partially transmissive to light and partially reflective, with some embodiments using materials that are up to about 50 percent transmissive. The projector array may include at least one row (or linear arrangement) of the projectors, and the projectors in the row(s) may be arranged with their output or projection lenses equidistally spaced apart (e.g., at a projector separation distance that is less than about 70 mm such as in the range of about 65 mm down to 30 mm or less). In some cases, 2 or more rows will be provided in the projector array, and the separation distance between adjacent pairs of projection lenses within a column may be equivalent (e.g., the average human interoccular spacing or some smaller value) to allow a viewer to rotate his head and still see a properly oriented 3D image. To this end, the input image provided to the projectors within a row (and, in some cases, through the array) are generally provided from live camera feeds or from images stored in data storage medium that are associated with a like number of spaced apart cameras or camera locations (e.g., POVs). For example, when a projector row has 7 projectors it may be useful to provide feeds from a row of seven cameras or from 7 camera locations separated by the projector separation distance (such as 30 to 65 mm or the like). Each of the rows in the array may have the same images input (e.g., with each projector in a column projecting the same image) or each projector throughout an array may have a unique image feed that has imagery with the point of view of an associated camera or camera location.

BRIEF DESCRIPTION OF THE DRAWINGS

FIGS. 6-13 illustrate functional block, plan drawings similar to FIG. 1 of projection systems of the invention with varying configuration or layout to achieve desired 3D image displays;

DETAILED DESCRIPTION OF THE PREFERRED EMBODIMENTS

Briefly, embodiments of the present invention are directed to 3D or autostereoscopic projection systems, and associated methods, for projecting or displaying an image having depth to one or more viewers. The projection method involves providing a projector array or assembly with one or more rows of projectors that are each spaced apart a projector distance (e.g., projectors within a row but in differing columns and projectors in differing rows are spaced apart from neighboring or adjacent projectors by about the human interoccular distance or less). An image stream or image data is input or fed to each of these projectors, with the images being provided to each projector from a camera or a camera position/POV that typically corresponds in location to that of the projector in the array (e.g., similar spacing of cameras or software tools/cameras used in animation). The projectors transmit along a number of spaced apart, parallel paths onto a retroreflective screen (or surface of such screen), and the images are reflected back to a beam splitter or a reflective surface of a transmissive device. The images are then reflected to the viewer at a projection or display viewing zone/area (e.g., a porthole of a submarine, a viewing window of a ride or attraction, or the like), where a viewer views two or more of the images concurrently (such as one image stream with one eye and a neighboring/adjacent stream with the other eye) such that, in some embodiments, the viewer perceives a 3D image a distance behind the beam splitter or reflective surface.

The size and shape of the display viewing area/zone may be varied to practice the invention and will depend upon the number of projectors in each row (i.e., number of columns in the array), the number of rows of projectors, and the spacing between projectors within a row and within a column. For example, the projector array may be a 1 by 9 array of projectors spaced 50 mm apart within rows and columns (less than the average interoccular spacing) or a 7 by 21 array of projectors spaced about 65 mm apart in rows and columns (about the interoccular spacing), and the projection or viewing area (or window) would have a similar size (e.g., about 50 mm by 450 mm or about 455 mm by 1155 mm for these examples). In practice, the viewers may then view a 3D image by looking through the viewing zone/area with their eyes located in nearly any position, and the viewer will typically view image streams from two adjacent or neighboring projectors within the projection array.

Figure 1:
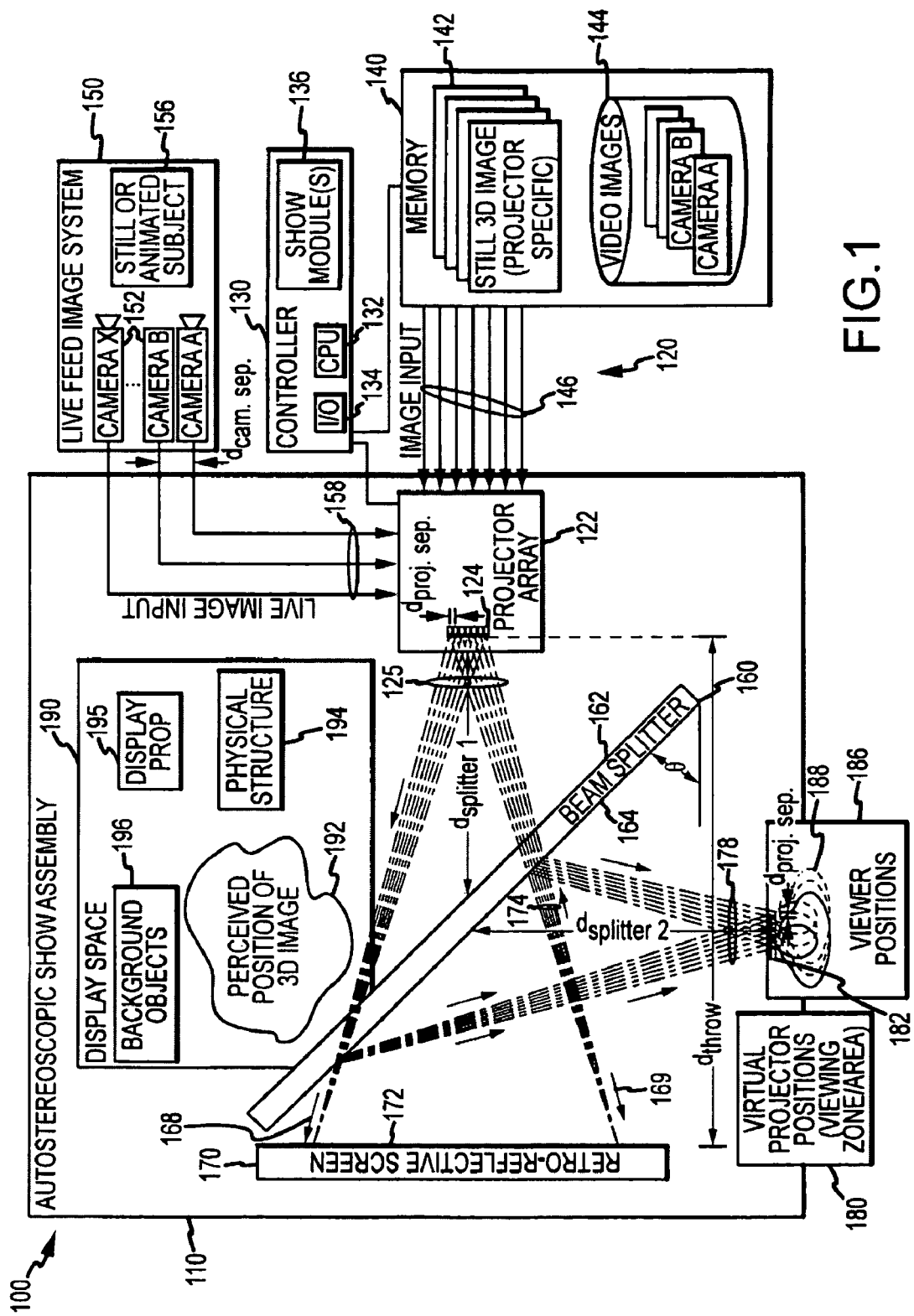
FIG. 1 illustrates a functional block drawing in plan or top view of a projection system for displaying 3D images to viewers that in multiple viewing positions (e.g., have multiple eye or viewing locations) without use of eyewear or a need for tracing viewer's eye positions.

FIG. 1 illustrates a 3D or autostereoscopic projection system 100 of an embodiment of the present invention that is useful for displaying or projecting still or video/animated multidimensional images to viewers. The viewers may view the images in 2 or more positions (or eye locations) without the need for glasses or headgear. The system 100 includes an autostereoscopic show assembly 110, which may be a set or scene used in a theme park such as walk-through or ride-through attraction or another application in which it is desirable to provide the illusion to a viewer that a 3D image is located in a particular space (such as a video game or a pre/post-show display device). As shown, the show assembly 110 includes a display space 190 with physical structure 194 (such as foreground structures, furniture, and the like in a room), display props 195 (such as items for the projected image to interact with for example), and background objects 196, and the 3D image 192 that is perceived by a viewer 188 is virtually positioned within the display space 190 (e.g., in some non-limiting examples, behind a beam splitter 160 from the viewer's 188 perspective/position 186). The show assembly 110 may provide the display place 190 in the form of a room or area that is in the line of sight of the viewer 188 in any of the 2 or more viewer positions 186 at the viewing zone 182, and other components of the system 100 except for the beam splitter 160 typically would not be visible to the viewer 188 or, at least, would not be provided directly behind the viewing space/area 180 (e.g., the positions of the virtual projectors).

To generate the perceived image 192, the system 100 includes a projector array or assembly 122 with two or more projectors 124 operable by a controller 130 to project or transmit a like number of images 125 toward a first or back surface 162 of a beam splitter 160. The projectors 124 may take many forms to practice the invention with one embodiment using 25 lumen projectors that are rectangular in shape and configured to allow their projection lenses to be positioned for substantially parallel output of the rays/images 125 and with a small or tight projection separation distance, $d_{proj\ sep}$. For example, it may be desirable to choose projectors that are small enough such that the separation distance, $d_{proj\ sep}$, may be equal to the average or maximum human interoccular distance or, in some preferred embodiments, less than such average. Specifically the average interoccular spacing may be about 65 to 70 mm and the distance may be chosen to be less than about 70 mm with some embodiments having projector separation distances, $d_{proj\ sep}$, in the range of about 30 mm to 60 mm with others set to better match the average human interoccular spacing of 65 mm.

A key fact about the present invention is that the spacing, $d_{proj\ sep}$, does not have to be within a tight band about the human interoccular spacing. Instead, some preferred embodiments have projector separations that are substantially less than this value (e.g., separations that are 25 to 50 percent of the human interoccular spacing) with projector sizes and configuration being one of the only limitations on how close the projectors may be placed together. The brightness or power of the projectors 124 may also vary to practice the invention with the range of a few lumens up to 120 lumens or more being useful in most applications. Miniature or microprojectors presently being developed for use in cellular phones and other small electronic devices may be used for the projectors 124, and these typically have brightness levels of 10 lumens and are well-suited for projecting digital video and other images/image data. The number of projectors 124 may also be varied and the arrangement of the array 122 chosen to suit a desired image effect and/or viewing area 180 shape and size (as is discussed in more detail below with reference to FIGS. 4 and 5), with 3 to 15 or more in one or more rows being useful in some embodiments and 7 in a row shown in FIG. 1 only as one example that produces 2 or more viewer positions 186.

In addition to the projector assembly 122, the projection control system 120 includes a controller 130 that functions to operate the projectors 124 in a synchronized manner (e.g., concurrently showing feeds of digital video or the like of an image from two or more POVs or camera positions). To this end, the controller 130 may include a processor or CPU 132 along with input/output (I/O) devices to allow an operator to select images for display and or to select one or more show modules 136, which may be software routines or coded algorithms that are run by CPU 132 to provide a synchronized retrieval/accessing of images or image data and transmitting these images to the projectors 124 for projection into the show assembly 110 as shown at 125. The controller 130 by running the modules 136 or otherwise may selectively operate the projectors 124 (typically all are run together) so as to make a particular image 192 appear to a viewer 188 and later disappear and/or be replaced by another image 192.

The controller 130 operates the projectors 124 in part by turning the projectors on and off (e.g., providing power to their lamps/bulbs/light sources from a power source not shown) and by providing image input such as digital still or video images. The image input 146 may be provided from memory 140 accessible by the controller 130, and the stored image data may include still 3D images 142 that correspond to a particular one of the projectors 124. For example, seven images may be captured and stored 142 from a camera(s) at seven side-by-side locations separated by about 65 mm or less (e.g., the average human interoccular spacing or less), and these images 142 may be provided in digital or other forms to the projectors 124 as image input 146 for projection as image rays or projected images 125. Alternatively or additionally, sets of video images 144 may be stored in memory 140, and these images 144 may be associated with a set of cameras or camera locations that are paired with or correspond to the projectors 124 and their spacing, $d_{proj\ sep}$. In some embodiments, for example, digital video cameras are positioned in an array similar to the array 122 with like spacing (e.g., 65 mm or less) while in other cases the spacing of the cameras used to capture images 144 differs from the projectors 124 to achieve a desired effect (e.g., camera spacing may be greater or smaller than the projector spacing, $d_{proj\ sep}$, to practice the invention but often will be substantially equal).

The input 146 is typically, but not always, matched to a camera in a similar location (e.g., right end camera or image data provide to right end projector and so on). In other embodiments, the video images 144 include 3D computer graphics or animation and the cameras are graphic devices used in animation that are placed in desired locations such as 7 side-by-side locations in the embodiment of the projector array 122 of FIG. 1. The controller 130 may also use live image input 158 to the projectors 124 from a live feed image system 150. In this case, a number of cameras 152 matching the projectors 124 may be used to obtain the image input 158 by focusing upon a still or animated object (e.g., a live actor or the like) from various locations to provide a plurality of images from varying locations (e.g., image capture positions or locations or POVs). Again, the outputs of the cameras 152 are typically associated with particular projectors 124 to project an image 125 matching (or intentionally varying from with differing spacing or the like) the "filmed" subject 156.

The projector array 122 is provided at one side of the show assembly 110 and the projected images (or rays of light associated with such images) 125 travel toward and strike a first or back surface 162 of a beam splitter 160. The beam splitter 160 is positioned within the assembly 110 to be in the path of the projected images 125 at a distance, $d_{splitter}$ 1, and at a reflection or splitter angle, θ, that are selected such that the projector lenses are placed virtually where the viewer's eyes are intended to be during operation of the projection system 100 (e.g., in a viewing zone 182 within a viewing space/area 180). The beam splitter 160 may take many forms to practice the invention, and it is typically chosen to provide both transmissivity and reflectivity with a range of 1 to 50 percent reflectivity being useful in some embodiments. For example, plate or other glass may be used that is inherently about 90 to 95 percent transmissive of light and about 5 to 10 percent reflective. In other cases, a sheet of Mylar™ or other transmissive and reflective material is used for splitter 160. The beam splitter or reflection angle, θ, may be chosen as a useful value for folding over light from the projectors 124 or to reflect light onto a viewing area in a manner that hides the location of the projector array 122 and reflective screen 170. In some embodiments, the splitter 160 is set in the path of the images 125 at a 30 to 60 degree angle with 45 degrees being useful in many cases (as measured from a plane passing through the display viewing zone 182 or, in some cases, from a plane containing the projection lenses which typically would be coplanar to achieve parallel projected images 125).

A portion of the light of images 125 is transmitted through the beam splitter 160 as shown at 168, 169. Significantly, the projection system 100 also includes a retroreflective screen 170 with surface 172 that reflects the received light/images 168, 169 at the same angle or along the same path as shown at 174 and with a gain in brightness. Retroreflective screen 170 has a surface 172 that is configured to reflect a wave front, such as images 168, 169, back along a vector that is parallel to but opposite in direction from the angle of incidence (which differs from a mirrored or typically reflective surface such as surface 164 of beam splitter 160 that only performs such function if the mirrored or reflective surface is exactly perpendicular to the wave front). The material of surface 172 may also provide high gain such as by reflecting back rays (such as rays 174) with a brightness level of 100 to 1000 times that received. In some embodiments, the screen 170 includes a surface that provides gain up to about 1600× to 3000× or more such as may be provided with surface 172 formed of retroreflective screen material distributed from 3M, Inc. as 3M Scotchlite™ 7610 retroreflective screen material or the like.

The rays 174 reflected from retroreflective screen 170 then strike the second or front surface 164 of the beam splitter 160 where, again, a portion is transmitted through (e.g., 95 percent for some plate glass embodiments of splitter 160) and a portion is reflected as shown at 178. A viewing space/area 180 is provided in the assembly 110 and includes a display viewing zone 182 at a distance, $d_{splitter\ 2}$, that typically is equal to (or within a relatively tight range from) the distance, $d_{splitter\ 1}$, the projector lenses are from the beam splitter 160. The display viewing zone 182 may be thought of as containing the virtual projector positions for the projection system 100 and is one of the preferred locations for the viewer 188 to view the projected images to perceive the 3D image 192. In other words, the display viewing zone 182 and the lens locations of the projectors 124 are equidistant from the beam splitter 160 (or surfaces 162 and 164, respectively) such that the light rays 178 reflected from the beam splitter 160 converge at the display viewing zone/location 182. The display viewing zone 182 may be a physical structure such as a window or porthole formed of transparent material such as glass or plastic or may simply be an opening or location in space/area 180 at which the rays 178 converge that is accessible to viewers 188 (e.g., the viewers 188 may position their eyes at or near the display viewing zone 182). The images are converged at multiple points that may be considered virtual projector positions upon the display viewing zone 182 and correspond to the projectors 124 and have the same or substantially the same separation distance, $d_{proj\ sep}$ (with equidistant positioning of the display viewing zone 182 and the projector lenses/outputs). During use, a viewer 186 may take two or more viewing positions 186 to see the perceived image 192 within the display space 190 behind the beam splitter 160 by moving his eyes about the array of images 178 apparently emanating from the display viewing zone 182. In the illustrated example of system 100, there are at least 7 projected images and if these are spaced, $d_{proj\ sep}$, about the interoccular spacing of 65 mm then the viewer can view the image in at least 6 positions (e.g., with each of his eyes aligned or partially overlapping each virtual projector location) with this number quickly increasing if the array 122 includes more than one row.

With the description of system 100 of FIG. 1 in mind, it will be clear that the invention is useful for projecting images 125 without requiring the user/viewer 188 to wear glasses or headgear and without head or eye tracking of the viewer 188. The image input 146 may be digital video providing a 3D image in full-color, in high (or lower) resolution, and/or with movement/animation. In some embodiments, the viewing space/area 180 is large enough (e.g., the number and spacing of the projectors 124 is large enough) such that two or more viewers can view reflected image 178 to simultaneously perceive the 3D image 192 in the display space 190 (or other embodiments with two or more beam splitters may be used as discussed below to provide two or more display viewing zones like zone 182). As with holograms, the viewer 188 can move his head side-to-side (with a 1 by x array), and up and down (with an x by y array where x and y are both 2 or greater), from anywhere within the display viewing zone 182 to see a perceived 3D image but from a new and appropriate point of view (e.g., move his eyes to associate them with differing pairs of the projectors 124 in the array 122 and the associated input images collected from differing camera locations or POVs).

The nature of the technique or configuration of system 100 allows a designer to place the virtual image 192 in space 190 in conjunction with real objects 194, 195, 196, if desired as with a theatrical "Pepper's Ghost" configuration. In such a case, the X-Y-Z coordinate position of the virtual image 192 does not wander as the viewer 188 moves his eyes between viewing positions 186 (or virtual projectors) as is the case for other stereoscopic viewing systems, but, instead, the perceived image 192 remains locked to the real objects 194, 195, 196. Further, in practice, the imagery 192 provided by reflected rays 178 is self-occluding such that objects or characters of image 192 do not appear ghosty or vectorized. Also, if the perceived image 192 crosses a real world object 194, 195, or 196 in the scene 190 that is properly lit (e.g., dimly lit or with lower brightness), there is easily enough brightness in the image 192 to overpower the dimmer background images such as objects 196 and make the moving image 192 look opaque to the viewer 188.

The system 100 may be thought of as containing a few relatively important components including a high-gain retroreflective screen 170, a number of synchronized projectors 124, and a beam splitter 160 positioned so that the projector lenses are placed virtually where the viewer's eyes are intended to be or at the display viewing zone 182. The high-gain retroreflective screen surface 172 sends the appropriate image 174 to the intended eye only (e.g., maintains alignment and spaced-apart position of each of the images 125 from the projectors 124). Instead of just a right and a left eye image as prior devices used, there is an image from a particular camera or camera location/POV for each viewing position or each eye location. During operation of the system 100, the viewer can look around (or above and below with some arrays 122 that have 2 or more rows of projectors 124) projected objects 192 by moving his head.

Regarding the display viewing zone 182, the number and spacing of projectors 124 determines the size and shape of the zone 182 from which viewing is possible. The array of projectors 122 typically has a number of rows and a number of columns of projectors (e.g., at least one row with 3 or more projectors and more typically many more would be used in each row with 2 to 7 or more rows being provided). The spacing between lenses, $d_{proj\ sep}$, in both the X and Y directions typically is equal to or less than the average human interoccular spacing (e.g., less than approximately 65 mm). One embodiment of the array 122 has a projector spacing, $d_{proj\ sep}$, equal to roughly half of this spacing or in the range of about 25 to 40 mm. For a given viewing area size, doubling the density multiplies the number of projectors required by four, and this square law generally applies to whatever density is chosen. The display viewing zone 182 also has a depth. As the viewer 188 pulls back from the nominal viewing plane, he continues to see the image 192 in stereoscopic 3D.

Generally, the resolution of the image 192 is not significantly degraded by the use of the projection system 100, and the system 100 will have a resolution about as good as the resolution of the projectors 124, which differs from lenticular and other stereoscopic techniques. Color is as good as the projector can deliver and no filter needs to be used (but may be used if desired to change the color of a projected image 125 prior to viewing as rays 178). The brightness experienced by the viewer 188 can be extremely high owing, in part, to the high gain provided by the screen 170. One embodiment uses a 1600× gain screen, but higher and lower gain retroreflective surfaces may be used in system 100. In testing, it was found that indoor viewing in a well lit area (e.g., at office level lighting levels) was sufficiently bright on a 6 foot by 8 foot screen 170 with 10 lumen projectors 124 and a plain, uncoated glass beam splitter 160 (sometimes termed "Pepper's Ghost glass"). Further, outdoor installations are likely practical with brighter or higher level illumination projectors 124 and/or a more efficient beam splitter 160 (e.g., a 50 percent reflective beam splitter may be optimal in some cases but is not required in the system 100). Since the screen surface 172 returns such a high proportion of the light directly to the viewer 188 via splitter surface 164, the usual square law for illumination does not apply. Note, screens 170 can be quite large without the usual penalty in projector lumen requirements. The viewing angle at the display viewing zone 182 is generally equal to the projector lens angle. The viewing angle of the system 100 is limited only by the beam splitter 160. The size of the perceived image 192 is roughly equivalent to the projected area and can be as large as desired for an application.

The configuration and features of the system 100 provide a number of advantages to the designer of a 3D display. Besides the advantage of not requiring the viewer to wear any glasses or headgear, there is no need for head tracking or eye tracking mechanisms. Multiple viewers can see the same or different (e.g., customized) 3D images in the same locale or general vicinity. Multiple viewers can view the same content and still see each other as desired to gauge others' reactions to displayed images. The screen 170 can be either actually or virtually where the image appears (with actual locations described below in alternative embodiments to system 100). Bright 3D objects can be superimposed over real scenery or dimensional backgrounds. The screen 170 does not have to be a flat or planar surface 172 as shown in FIG. 1. The retroreflective screen material may be wrapped inside or around a cylinder, sphere, or other object/shape, or placed upon a contoured wall or surface such as a wavy or non-planar wall. Angles as high as about 45 degrees from normal have been found to exhibit no detectable light loss, and the surface 172 may even be cut to desired shapes and applied to objects (e.g., the surface 172 may be provided on one, two, or more objects rather than as a single, rectangular, planar surface). In some cases, the screen 170 can even be at differing throw distances, $d_{throw}$, as measured between the surface(s) 172 and the projector lenses or output surfaces. In some cases, a large wall of screen 170 can have several different viewers using it at the same time, and each viewer may have a differing perceived image (even when the viewers are just inches to several feet apart) by providing two or more projector arrays 122 or providing differing image inputs 146, 158 to differing portions of a single projector array 122. During use, there are no wrong or reversed image viewing positions where the viewer may see inside-out or pseudo stereoscopic images, and there is no "start over" effect when the viewer moves far enough to the side as found in some prior auto-stereoscopy methods. As noted above, the viewing area is limited in size and shape only by the number of projectors 124 or projector outputs/lenses.

Figure 2:
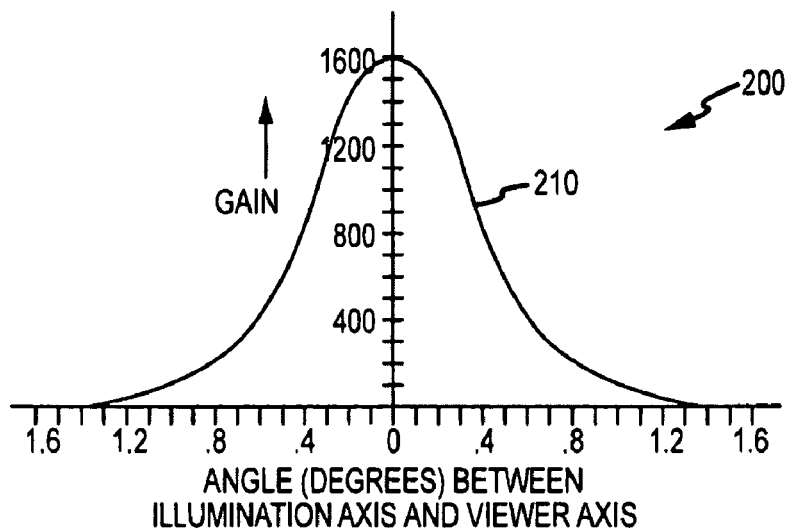
FIG. 2 is a graph illustrating a screen reflectivity curve for a single projector.

There is a linear relationship between the minimum viewing distance (or $d_{throw}$) and the inter-lens spacing, $d_{proj\,sep}$, of the projectors 124. The linearity factor depends on the reflectivity curve of the screen material, with the graph 200 of FIG. 2 showing one exemplary reflectivity curve 210 for a reflectivity surface 172 fabricated from the 3M 7610 screen material. The curve 210 assumes the screen such as retroreflective screen 170 is illuminated through a beam splitter such as splitter 160, and the angle in the graph 200 refers to the number of degrees between the light's optical axis and the viewer's optical axis. For the example shown in graph 200, the half-reflectivity point of the curve 210 is about 0.5 degrees off axis. Other types and grades of retroreflective material will likely have different angle values for the half reflectivity point, and these angles may be used to change the optimum throw distance, $d_{throw}$, depending upon the application.

Figure 3:
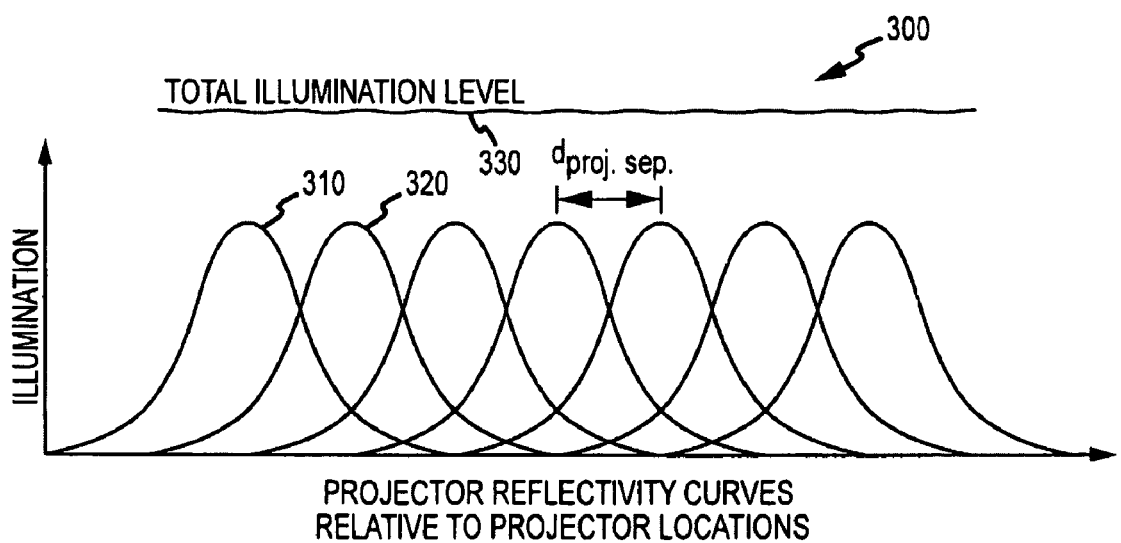
FIG. 3 is a graph illustrating illumination for a set or array of projectors based on projector locations and/or separation.

Adjusting the throw distance (or virtual throw distance), $d_{throw}$, from the projectors 124 to the screen surface 172 affects the uniformity of light level as perceived by an observer 188 moving from virtual lens position to virtual lens position at viewing zone 182. The goal is to have the sum of the contribution from all projectors 124 at any point in the display viewing zone 182 be a constant. If the screen 170 is too close (less than the minimum optimum throw distance, $d_{throw}$, which may be 8 to 10 feet or more depending upon the material of surface 172), there may be a light intensity modulation perceived by a moving viewer that is distracting. FIG. 3 illustrates a graph 300 with a total illumination level 330 provided to a viewer by a plurality of projectors 124 associated with reflectivity curves 310, 320. Generally, putting the screen 170 further away or using a larger throw distance, $d_{throw}$, does not affect uniformity of illumination. The system 100 described by graph 300 has an inter-lens spacing, $d_{proj\,sep}$, of 34 mm or about half of the average human interoccular spacing. If the inter-lens spacing were doubled, the lens to screen throw distance, $d_{throw}$, should also be doubled. If a screen material with a tighter retroreflective factor (e.g., half reflectivity point at a smaller angle than shown in FIG. 2) were used, the screen 170 may need to be moved back further still (e.g., more than about 10 feet) to preserve light uniformity as the viewer moves in X or Y directions (horizontally or vertically). A wider reflectivity curve generally allows a designer to move the screen 170 closer to the viewer 188 (and projectors 124).

Figure 4:
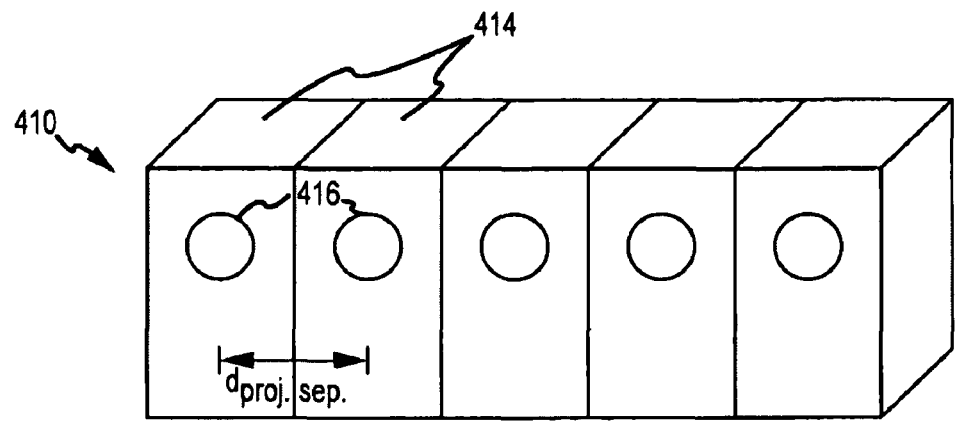
FIG. 4 is a perspective view of one embodiment of a linear projector array or assembly that may be used in systems such as the system of FIG. 1 to provide a 3D image.
Figure 5:
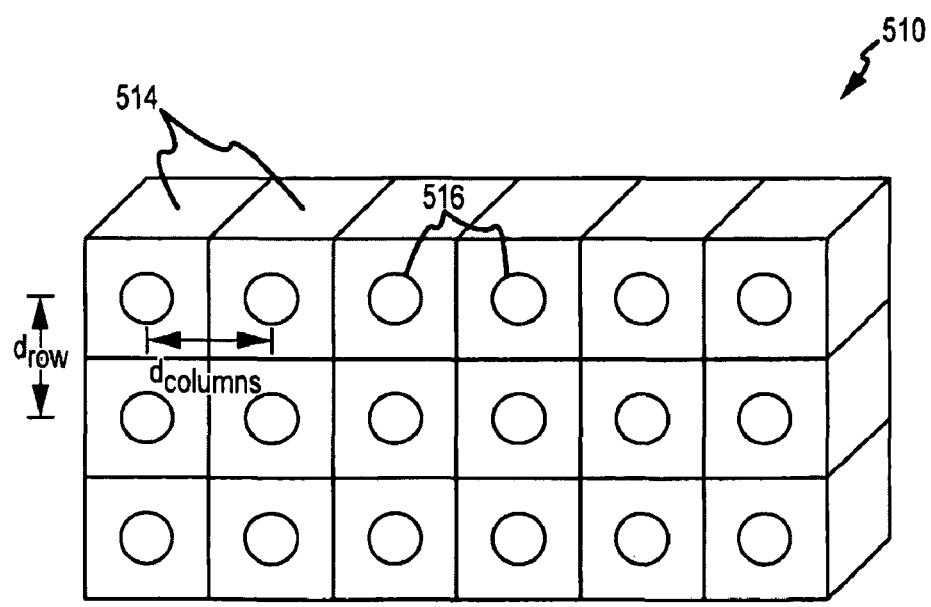
FIG. 5 is a perspective view of a two-dimensional projector array or assembly that may be used in projection systems of the invention such as the system of FIG. 1.

FIGS. 4 and 5 illustrate a pair of projector arrays 410, 510 that may be used in systems of the invention such as projection system 100 of FIG. 1. The arrays 410 and 510 are useful for illustrating that the number of projectors that may be included in a row may be varied to provide a wider projection or display viewing zone/area (e.g., allow more horizontal viewing by a viewer) and that the number of rows provided may also be varied to provide a taller projection or display viewing zone (e.g., to allow a single viewer to move his head and eyes up and down to see over or under an object and/or to allow multiple viewers of differing height to see the same or differing images). Array 410 of FIG. 4 includes 5 projectors 414 placed in a row with their lenses 416 in a linear orientation or aligned in a line (e.g., a line may be passed through the center of each lens) and the bodies of the projectors 414 are, in this example, placed in abutting or side-by-side contact so as to minimize the inter-lens separation, $d_{proj\,sep}$. In other cases, some spacing may be provided between the projectors 414 to set a desired projector spacing, $d_{proj\,sep}$. The array 410 may be considered a 1 by 5 array of projectors 414 and would provide a display area that is linear or somewhat rectangular in shape, with a width of about 4 to 6 times the projector separation distance, $d_{proj\,sep}$, which is typically less than the human interoccular spacing of about 65 mm and a height of about 1 to 2 times the $d_{proj\,sep}$. In other embodiments, the number of projectors (or lenses/outputs) may be decreased or increased such as chosen from a range of about 3 to nearly any upper limit such as up to 100 or more projectors 414 (or lenses/outputs 416).

In FIG. 5, array 510 is shown to include three rows and six columns of projectors 514 with lenses 516. This would provide a similarly shaped display or projection area. Of course, the number of projectors 514 provided in each row may be varied widely as may the number of rows. As discussed with reference to FIG. 1, image input such as digital video or the like would be provided to each of the projectors 514. In some embodiments, each projector 514 would be used to project images associated with a differing camera location or POV with similar camera or position spacing as provided in the array 510 (or differing separations such as larger or smaller separations to create a particular effect). In other embodiments, the projectors 514 in each row are fed the same set of image inputs. Specifically, then, the same image would be projected from each projector 514 in a column of the array 510. In typical preferred embodiments, the distance between projectors 514 within a row, $d_{column}$, is the same as the separation distance between projectors 514 in adjacent rows, $d_{row}$ (e.g., the distance between projector lenses within a row equals the distance between projector lenses within a column). In this manner, a viewer may rotate his head clockwise or counterclockwise to align his eyes with projectors in a row or within a column and still perceive a realistic 3D image. Typically, each row will include an equivalent number of projectors but some embodiments may vary the number of the projectors in an array (e.g., to achieve a desired shape of a projection area such as a circular projection area versus a rectangular or square display area).

Figure 6:
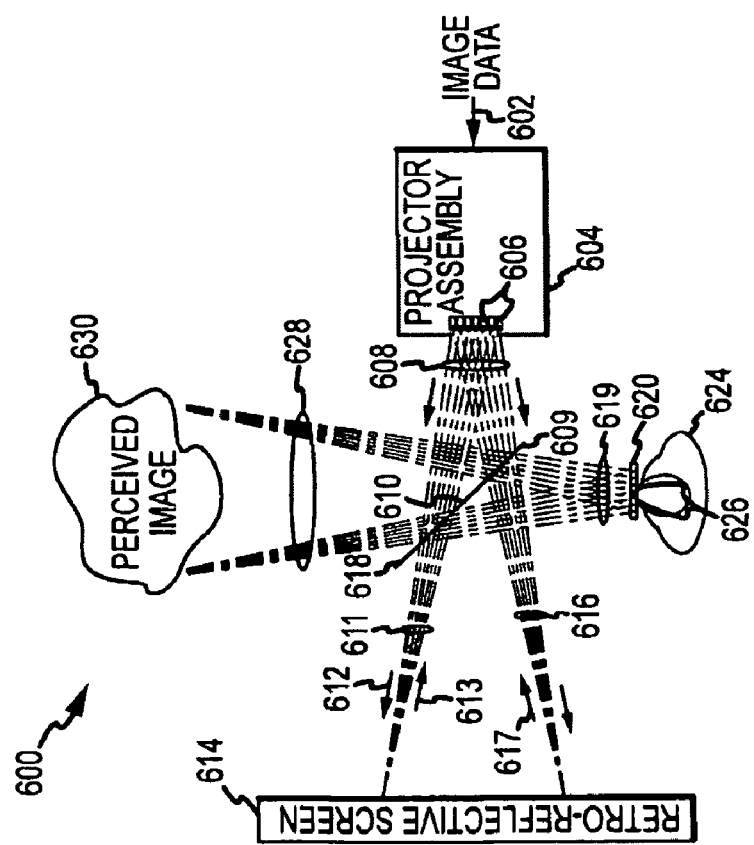

FIGS. 6-13 are included to facilitate discussion of the design flexibility for a projection system provided by the use of multiple projectors providing images from a like number of cameras/camera locations (or POVs). The location of the retroreflective screen and the beam splitter with respect to the viewer (or display viewing zone/area) can be varied widely to suit a particular application. In the system 100 of FIG. 1, the beam splitter 160 and the screen 170 are shown to be vertical relative to a floor but numerous other arrangements are useful. FIG. 6 illustrates a 3D projection system 600 similar to that shown in FIG. 1 with image data 602 being fed into a projector assembly 604 for projection via a plurality of projectors 606 (e.g., one or more rows of 7 projectors) as shown with rays 608. A beam splitter 609 is positioned in the path of these projected rays 608 with a portion being reflected from a first or back surface 610 and the rest being transmitted through and from a second or front surface 618 as shown by rays 611 having a direction shown at 612. These light rays or wave front 611 strike retroreflective screen 614 and are reflected back along opposite paths/vectors as shown with rays 616 and direction arrows 613, 617 to then strike beam splitter 609 on surface 618. The beam splitter 609 reflects a portion (such as 50 percent) of the light in rays 616 as shown with rays 619 into a display viewing zone or area 620, where they can be viewed by a viewer 624 who can position his eyes 626 at two or more viewing locations (e.g., about 6 with 7 projectors and the like) to perceive the image 630 at a position behind the beam splitter 609 (as shown with tracing of virtual rays 628 from viewing locations or display viewing zone 620). As shown, the beam splitter 609 and screen 614 are both vertical relative to a floor or platform upon which a viewer 624 may stand or sit, and the screen 614 is shown opposite the projectors 606 on an opposite side of the splitter 609 (e.g., the projector 604 is to the right of the viewer 624 and splitter 609 and the screen 614 are to the left of the viewer 624 and splitter 609).

Figure 7:
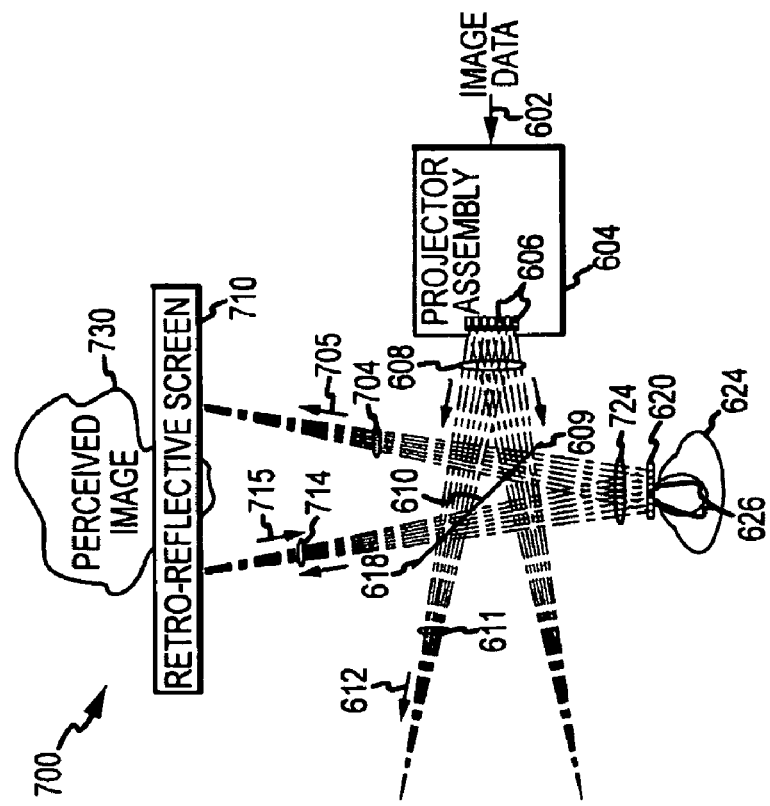
Figure 8:
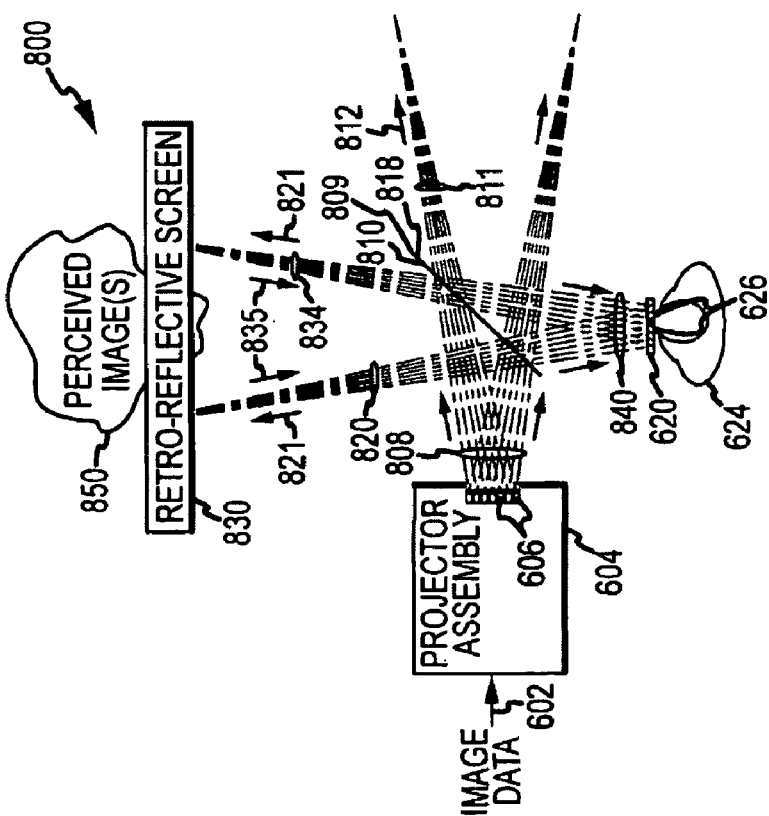

FIG. 7 illustrates another embodiment of a 3D projection system 700 similar in configuration to that of system 600 but with a retroreflective screen 710 positioned directly in front of the viewer 624. In other words, the screen 710 may be positioned where the virtual or perceived 3D image 730 appears. More specifically, in the system 700, the portion 704 of the projected image light 608 that is reflected by the first or back surface 610 of the splitter 609 (rather than the portion transmitted through the splitter 609) is transmitted as shown by arrows 705 onto the retroreflective screen 710. The screen 710 reflects the light 714 with high gain in brightness back toward the beam splitter 609 as shown by directional arrow 715. The beam splitter reflects some of this light 714 but also transmits a portion 724 (such as 40 to 60 percent or the like) through to the viewer 624 at display viewing zone 620. FIG. 8 illustrates another projection system 800 similar to that found in FIG. 7, but with the projector to the left of the viewer. As shown, the system 800 includes image data/stream 602 that is input to projector assembly 604 for projection via projectors 606 as shown at 808. A beam splitter 809 is positioned in the path of this wave front 808 such that the rays 808 strike a first or back surface 810 to be reflected in part and transmitted through via second or front surface 808 as shown at 811 with directional arrows 812. The reflected rays 820 travel as shown with arrows 821 toward retroreflective screen 830, which, in turn, reflects the rays 834 as shown with arrows 835 back toward the beam splitter 809 where they are reflected and transmitted as shown by rays 840 to a display viewing zone/area 620 for viewing by a viewer 624 at one or more viewing locations of his eyes 626 to perceive image 850 (e.g., at or near the location of the screen 830).

Figure 9:
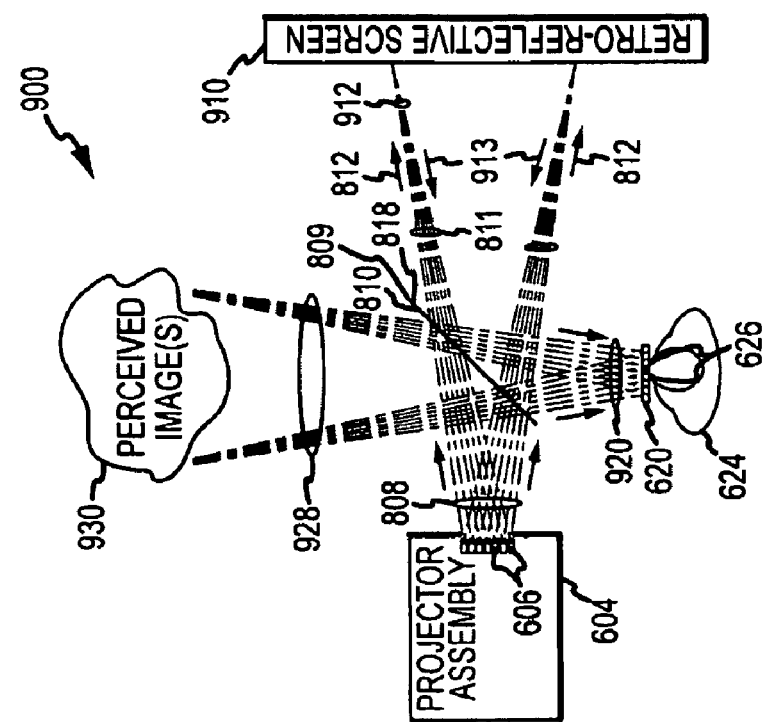

FIG. 9 illustrates another projection system 900 similar to that shown in FIG. 8 but with the retroreflective screen to the right of the viewer 624 and opposite the projectors 606. As shown, the projected image wave front 808 is transmitted through (in part) as shown with rays 811 along paths shown with arrows 812 toward the retroreflective surface 910. The surface 910 reflects with gain the images 911 as shown with directional arrows 913 toward the beam splitter front surface 818 where a portion 920 is reflected toward the display viewing zone 620 such that the viewer 624 perceives the image 930 via traced virtual rays 928 positioned behind the beam splitter 809. In the systems of FIGS. 6-9, the screens and splitters are all shown to be in vertical planes, but other arrangements may be useful in some applications.

FIG. 10 illustrates another projection system 1000 with a retroreflective screen that is coplanar with the floor or parallel to the floor. As shown, a projector assembly 604 is provided above the viewer 624 with image data 602 provided for projection in a synchronous manner by projectors 606. The projected images or rays 1005 are directed downward toward a beam splitter 1010 where they strike a first, back surface 1012 where some of the light is reflected and a portion 1020 is transmitted through via second, front surface 1014 as shown by directional arrows 1021 toward retroreflective screen 1030 that is placed on the floor or in a plane parallel to and offset from the floor. The retroreflective screen 1030 reflects with gain the rays 1032 back toward the beam splitter 1010 as shown with directional arrows 1034 where a portion is reflected as shown at 1040 toward a display viewing zone/area 1048 (such as a viewing window, porthole, or the like) by the eyes 626 of a viewer 624, which causes the viewer 624 to perceive a 3D image 1060 behind the beam splitter 1010 at a location shown by ray tracing of virtual rays 1050 from rays 1040.

FIG. 11 illustrates a projection system 1100 similar to that shown in FIG. 10 but with a retroreflective screen 1110 provided in front of the viewer 624. As shown, projected images 1005 are reflected in part as rays 1104 from the first or back surface 1012 of beam splitter 1010 as shown by directional arrows 1108 toward a retroreflective screen 1110. The screen 1110 is again vertical (or orthogonal to the floor), and it functions to reflect with gain light 1112 back towards the beam splitter 1010 as shown with arrows 1114. The splitter 1010 transmits a portion (e.g., 50 percent) of the light as shown at 1120 to projection surface 1048 where the image 1130 is perceived behind the beam splitter 1010 by viewer 624.

Figure 13:
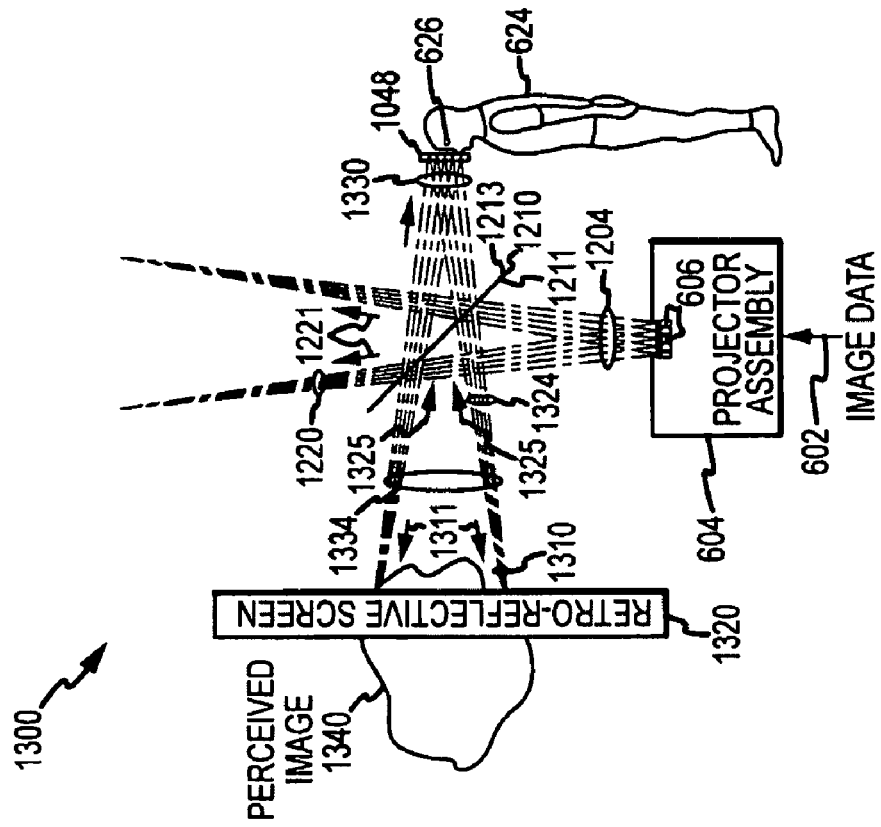
Figure 12:
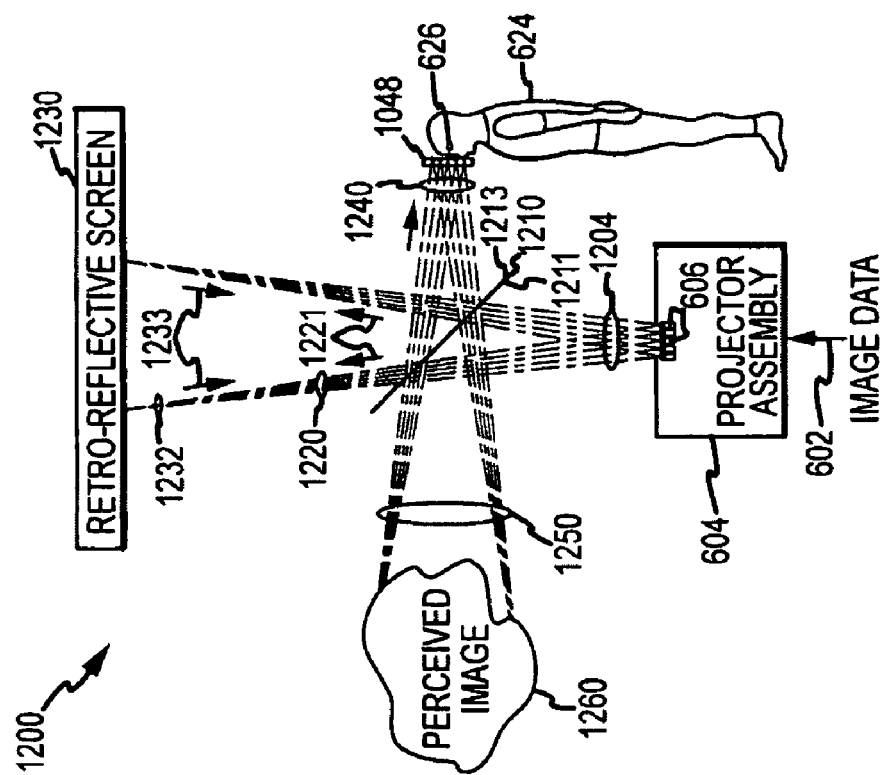

In FIGS. 12 and 13, the projector assembly 604 is positioned below the line of sight of the viewer, e.g., below the display viewing zone or area 1048. As shown in FIG. 12, the projectors 606 project images 1204 upward toward a beam splitter 1210 where they strike a first or back surface 1211 of the splitter 1210 and are reflected in part and transmitted in part through the splitter 1210 for transmittal via a second or front surface 1213 as shown with rays 1220 and directional arrows 1221. The retroreflective screen 1230 is positioned above the viewer and the projector assembly 1230 and reflects images 1232 as shown at 1233 back toward beam splitter 1210. Surface 1213 of splitter 1210 reflects images 1240 to display viewing zone/area 1048, and viewer 624 perceives 3D image 1260 in a position behind splitter 1210 as indicated by ray tracking 1250. FIG. 13 illustrates a similar projection assembly 1300 but with a retroreflection screen 1320 in front of the viewer 624. In operation, projected images 1204 are reflected (in part) from the back surface 1211 of splitter 1210 as shown at 1310 and direction arrows 1311 toward retroreflective screen 1320. The screen 1320 reflects the images with gain as shown at 1324 and directional arrows 1325 to beam splitter 1210 where they are transmitted through as shown at 1330 to display viewing zone/area 1048, with the viewer 624 perceiving 3D image 1340 behind the splitter 1210 (e.g., at or near location of screen 1320 in this case).

Figure 14A:
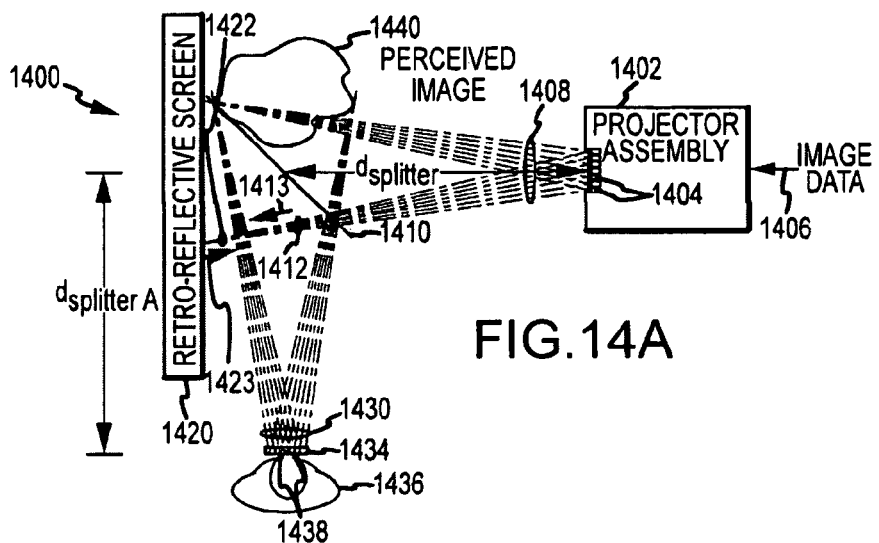
FIGS. 14A-14D illustrate a number of projection system embodiments similar to those shown in FIGS. 1 and 6-13 showing other embodiments in which the distance between the beam splitter and the projectors/viewing zone are varied to achieve a desired effect and/or the splitter has a differing position to alter the viewing location and/or the position of the perceived image.
Figure 14B:
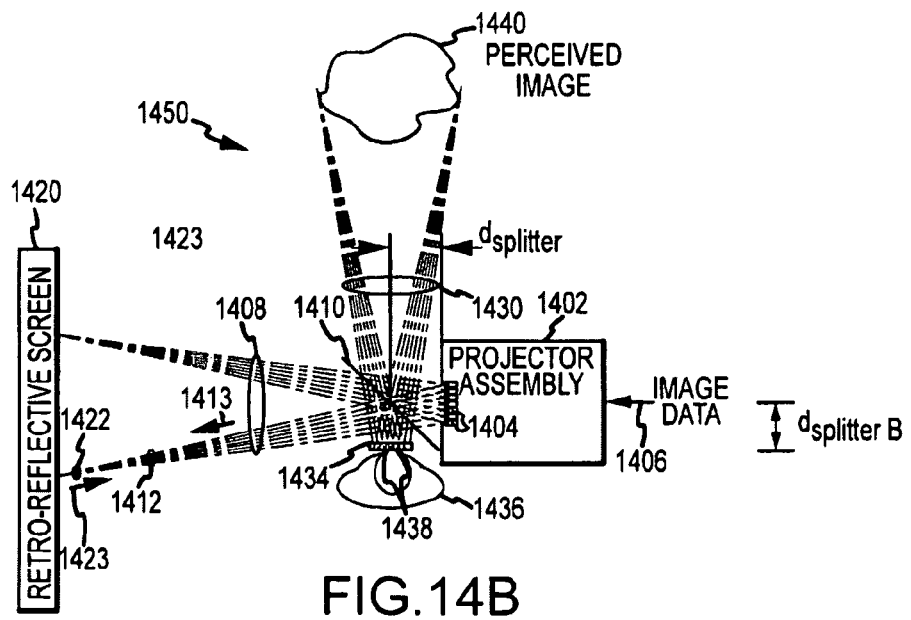
Figure 14C:
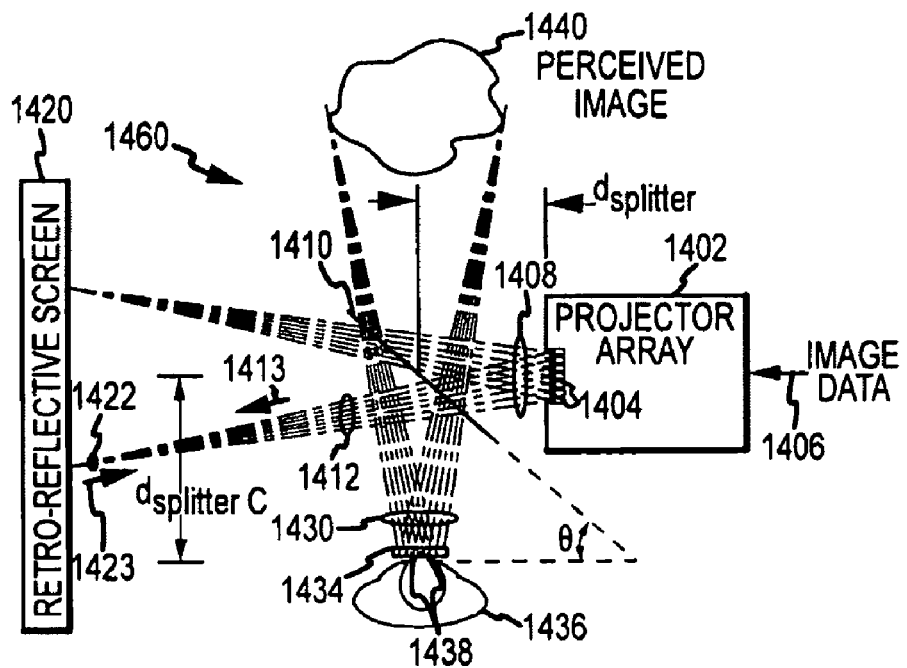

Another design variable or flexibility for 3D projection systems of the invention is that the placement of the beam splitter may be near the screen, near the viewer, and/or in between. The variable nature of the positioning of the splitter is shown in FIGS. 14A to 14C. In FIG. 14A, a 3D projection system 1400 is shown that provides a projector assembly or array 1402 with a number of projectors 1404 arranged in two or more rows with 3 or more columns. Image data 1406 such as digital video streams from a like number of cameras or the like is fed into the assembly 1402 and projected out as shown at 1408 toward a beam splitter 1410 (such as plate glass or the like) where at least a portion 1412 is transmitted through toward (as shown at 1413) a retroreflective surface 1420. The surface 1420 reflects with gain the light 1422 along direction 1423 toward splitter 1410 where it is in part reflected as shown at 1430 toward display viewing zone/area 1434 for viewing a viewer 1436 who may select two or more locations for his eyes 1438 to perceive 3D image 1440 behind the splitter 1410. In the system 1400, the beam splitter 1410 is positioned equidistally from the projectors 1404 and the display viewing zone 1434 (or viewing location) at a distance, $d_{splitter\ A}$, that is substantially large, e.g., the splitter is positioned proximate to the retroreflective surface or screen 1420 relative to projectors 1404 or display location 1434. For example, the throw distance may be 8 to 12 feet and the distance, $d_{splitter\ A}$, may be a large percentage or proportion of the throw distance such as 60 to 95 percent.

In contrast, system 1450 of FIG. 14B provides the beam splitter 1410 proximate to the viewer 1436 or display viewing zone 1434 as well as to projectors 1404. In other words, the distance, $d_{splitter\ B}$, to the splitter 1410 is relative small relative to the throw distance such as up to about 3 to 4 feet when the throw distance is about 10 feet. In FIG. 14C, the system 1460 provides the beam splitter 1410 in a more central location with a splitter distance, $d_{splitter\ C}$, that is between these other two more extreme locations (e.g., a distance of 4 to 6 feet when the throw distance is about 10 feet or a similar proportional value).

Figure 14D:
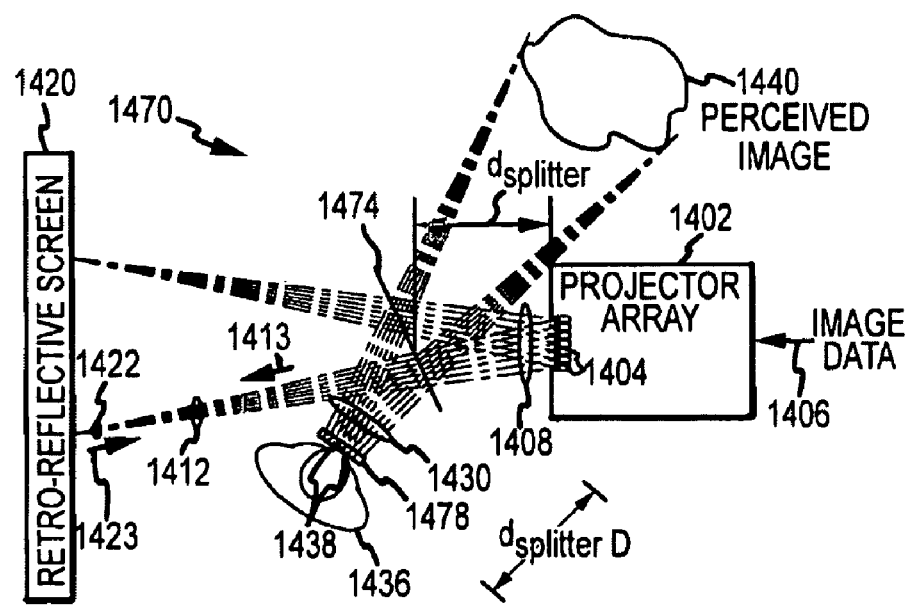

The angle, θ, of the beam splitter 1410 relative to the plane of the projection surface 1434 (or screen 1420) is selected to be about 45 degrees in many embodiments such as systems 1400, 1450, 1460. However, the angle, θ, between the splitter and the screen or display viewing zone may be varied to practice the invention. FIG. 14D illustrates a projection system 1470 in which the angle, θ, between the screen 1420 and the splitter 1474 is varied from 45 degrees, with a smaller angle shown for illustration purposes. As a result, the display viewing zone/area 1478 may be changed (i.e., not be in a plane that is orthogonal to a plane passing through the projector lenses or the screen 1420). By selecting the angle, θ, of the splitter 1474 the projectors 1404 may be placed in nearly any display viewing zone 1478 and such display viewing zones 1478 may have a variety of orientations. With the splitter angle, θ, varying from 45 degrees, the distance, $d_{splitter\ D}$, from the splitter 1474 typically still is equidistant for display viewing zone 1478 and projectors 1404 and may be varied as discussed with reference to FIGS. 14A to 14C.

The beam splitter may be glass, Mylar™, or any suitable partially transparent and partially reflective surface (e.g., a sheet of water may be used for the beam splitter in some cases as may a soap bubble or nearly any transparent/reflective material). In some embodiments, the beam splitter may be of simple construction such as a sheet, a plate, or layer of uncoated glass, but, if higher efficiency is desired, the splitter may be coated with a semi-reflective coating. For example, a coating that provides a beam splitter that is 50 percent reflective (and 50 percent transmissive) is sometimes considered optimum for maximizing light levels in the 3D projection systems described herein. Differing reflectivity levels (e.g., higher and lower levels) may be used, though, to practice the projection concepts with less light efficiency, which may be acceptable depending upon the brightness of the projectors, the ambient light levels, and gain provided by the retroreflective surface(s).

The projection system as described above allows the viewer to position his head level or cocked to the side at any angle and still see stereoscopic imagery. The projection systems may even allow a viewer to lie down sideways or hang upside down and view appropriate 3D viewing. However, there may be a number of implementations in which it is not necessary to allow for viewing at such arbitrary head angles. In such cases, the number of media sources may be drastically reduced. For example, instead of a separate media feed to each projector of an array with multiple rows, it may be sufficient to send a separate feed to each column of projectors but repeat images within that column in different rows (rather than providing a separate image input to each projector). In such a projection system, short and tall viewers alike would see the 3D imagery as from the same height or altitude, and the ability to see around objects by moving in the X or horizontal direction is preserved.

Figure 15:
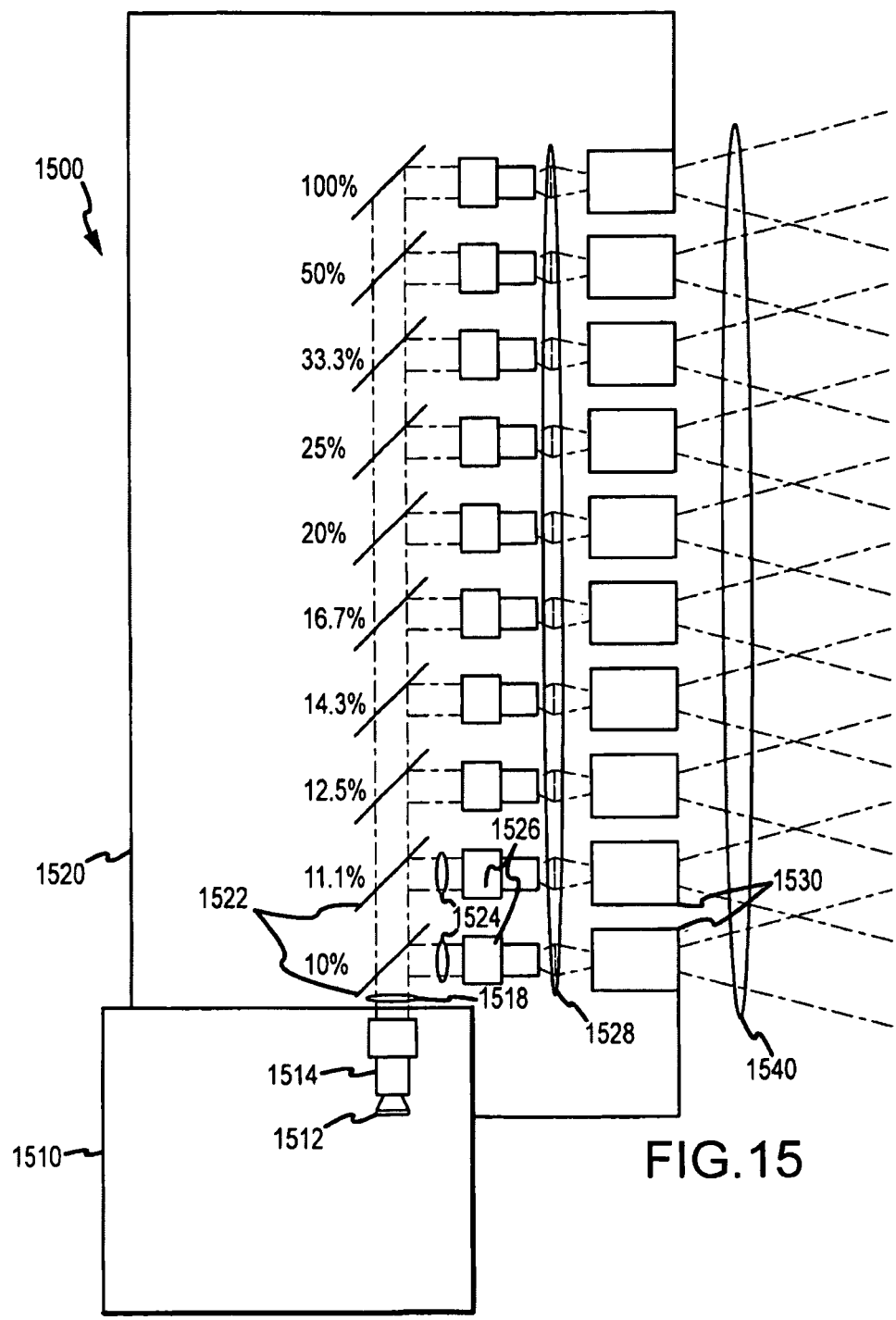
FIG. 15 illustrates a projector assembly of one embodiment such as may be used in projection systems of the invention such as to provide multiple projected, spaced-apart images with fewer projectors (e.g., less than one projector per projected image)

In some projection systems, not only is the number of video sources or input media reduced, the number of video imagers or projectors is similarly reduced. For example, since the projection system described here is so light efficient (e.g., the screen material may have an on-axis gain of up to 1600× or more), it is possible to use a common video projector with a custom lensing system to reduce the required number of video imagers or projectors to one per column of the projector array. FIG. 15 illustrates a projector assembly 1500 that provides such functionality with a projector 1510 with an image plane or image input 1512 provided via a relay lens 1514 to a splitter assembly 1520. The splitter assembly 1520 illustrated is a ten-way splitter but other splitting ranges or amounts may be provided in a projection system of the invention and will be selected to support the number of rows in an array. Here, the splitter assembly 1520 mates the relay lens 1514 output 1518 with a series of beam splitters 1522, with one embodiment providing splitters 1522 with varying percent reflectivity as shown (e.g., 10, 11.1, 12.5, 14.3, 16.7, 20, 25, 33.3, 50, and 100 percent reflectivity on the side proximate to the relay lens 1514 in this example). A portion of light is transmitted through the splitters 1522 (except, in this case, for the last splitter with 100 percent reflectivity) and on to the next one or adjacent one of the splitters 1522. The reflected light 1524 is directed to a relay lens 1526, and the output rays 1528 from these relay lenses 1526 is fed to a plurality of projection lenses 1530 that project the images or associated light waves 1540 outward from the projector assembly 1500 and on to a projection system beam splitter and retroreflective surface (not shown in FIG. 15).

Figure 16:
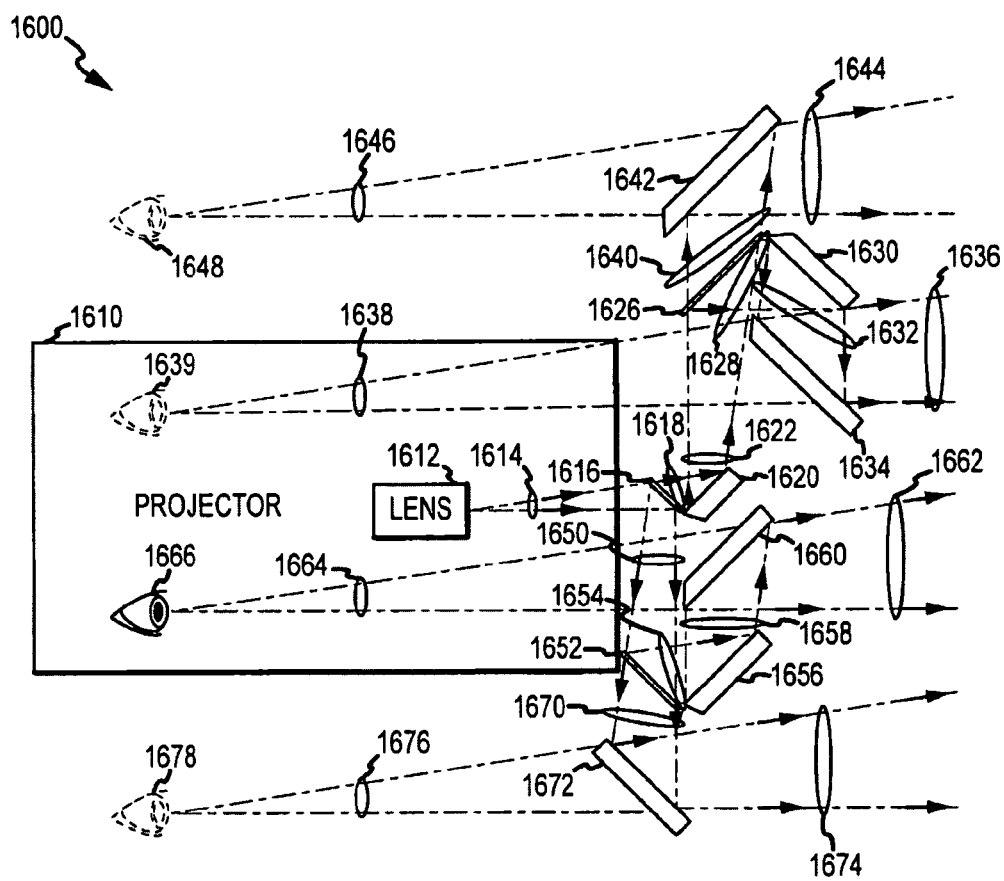
FIG. 16 illustrates in block form a projector assembly utilizing a combination of beam splitters and mirrors to project multiple image streams with a single projector rather than one projector per image stream.

In a similar fashion to the device of FIG. 15, an image may be split via beam splitters in a "tree" fashion so that one projector can produce 2, 3, 4, or more identical virtual lens points of view with some trade off of brightness for increased viewing area. The aspect ratio may become more letterboxed, but such a splitting within the projector assembly may require no custom lensing. FIG. 16 illustrates a projector assembly 1600 (or a portion of such assembly where the components shown in FIG. 16 may be repeated for each projector within an array to provide multiple images or virtual eye points for a number of rows within a particular column). In the assembly 1600, a projector 1610 is provided that outputs light 1614 associated with a video image (e.g., a particular camera or camera location/POV) via a projection lens 1612. The light 1614 strikes a beam splitter 1616 (e.g., a 50 percent reflectivity beam splitter) and a portion 1618 of the light 1614 is transmitted through to strike a mirror 1620. The reflected light 1622 then travels until it strikes another beam splitter 1626 at which point some light 1628 is reflected to mirror 1630 where it is reflected as light 1632 to strike yet another mirror 1634 to form output image rays 1636. These image rays 1636 may be traced 1638 back to provide a virtual eye or projection point 1639 for the projector 1610.

Similarly, the transmitted light 1640 strikes mirror 1642 and is reflected as a second stream of output images or light rays 1644, which can be traced 1646 back to a second virtual eye or projection point 1648 for the projector 1610. Light 1650 reflected from initial splitter 1616 is directed to strike another beam splitter (e.g., a 50 percent reflectivity splitter). A portion 1654 is reflected toward mirror 1656, which reflects the light 1658 onto an additional mirror 1660 to be reflected out as projected images 1662, which may be traced 1665 back to a third virtual eye or projection point 1666 for projector 1610. Further, transmitted light 1670 strikes mirror 1672 where it is reflected out from assembly 1600 as projected light or images 1674, which can be traced 1676 back to a fourth virtual eye or projector location 1678. In this manner, tree-type multipliers may be used to reduce the number of projectors that need to be provided in a projector assembly or array to provide a number of image streams that may be directed via a projection system beam splitter and retroreflection screen to a location of a viewer to display a 3D image to the viewer.

In some embodiments, it may be desirable to more tightly control (or limit) the viewer's Z-axis location (with Z being distance from the display viewing zone optimal plane). For example, an implementation may require a viewer to place his face relatively near a window or porthole to view a 3D image or a ride may be designed such that the conveyance or vehicle controls the viewing distance (the Z-axis location) to be near the optimal viewing plane. In such implementations, a projection system may be designed with a more relaxed or less stringent matching of the vertical spacing (in the Y axis) of the projectors and the horizontal spacing (in the X axis) of the projectors (sometimes termed projection separation distances between projectors in neighboring rows and in neighboring columns within a row). For example, it may be useful to set the Y-axis projector separation (or row spacing within a column) at about 25 percent more than the X-axis projector spacing. Such an embodiment has a viewing window with a greater size (greater height) without increasing the number of projectors (or projector lenses as discussed for the projector assembly of FIG. 15 or complexity of the projector as shown for the projector assembly of FIG. 16).

The systems described above have all shown systems with a single projection or viewing area, which may be viewed by more than one viewer (such as family members or friends or other groups). However, there are some settings where it is desirable to design a 3D projection system with 2 or more display viewing zones/areas to support concurrent viewing of projected images by two or more viewers at separate locations. These systems may be considered cases of increasing the ratio of viewers to hardware as they may use a single projector array or assembly to create a two or more displayed 3D images at two or more display viewing zones or areas.

Figure 17:
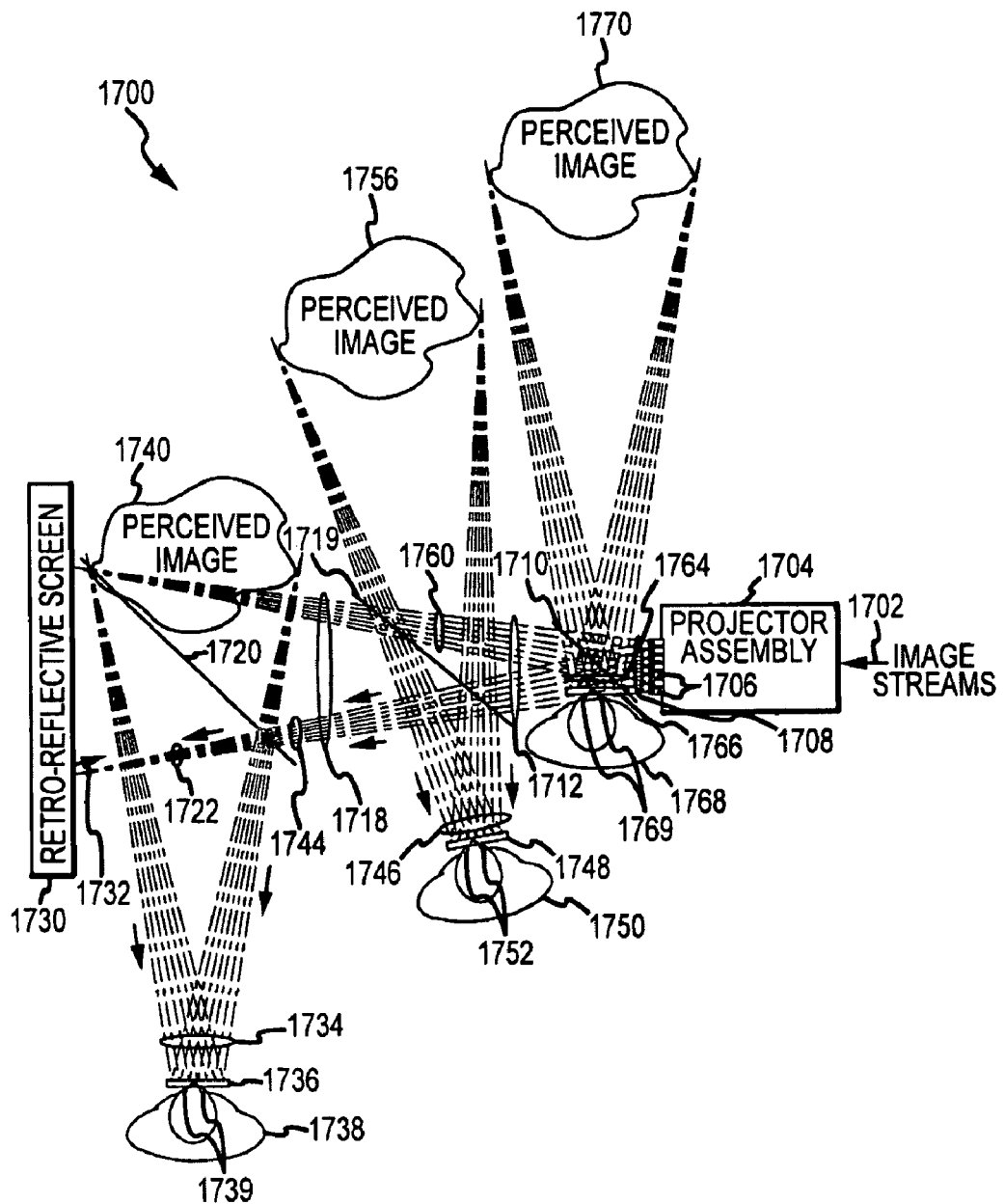
FIGS. 17 and 18 illustrate projection systems similar to those shown in FIGS. 1 and 6-13 that are adapted for displaying images to two or more viewers without doubling or tripling the number of projectors required.

FIG. 17 shows a 3D projection system 1700 that includes a projector assembly 1704 with a plurality of projectors 1706 arranged in an array to receive a plurality of image streams 1702 (e.g., one per projector 1706 or one per column in the array) and project or output a projected image or associated light wave front 1708. Since the projection techniques described herein provide great light efficiency projection methods, the beam splitter utilized may be a low reflectance element such as common glass (with reflectivity of about 5 to 10 percent) or the like. The system 1700 then can have an array of projectors 1706 that comfortably (or with high enough brightness) provide a viewing zone for one viewer but may be adapted for displaying 3D images to two, three, or more viewers. Additional hardware may include additional beam splitters (e.g., low reflectance splitters) with a single screen used for all splitters or separate screens may be provided for each of the beam splitters or display viewing zones or areas in some applications.

As shown in FIG. 17, the projector 1704 projects an image 1708 to a first beam splitter 1710, which allows most of the light 1712 to be transmitted through to a second beam splitter 1714 (e.g., about 90 to 95 percent in some cases but higher reflectance splitters may be used especially when brightness projectors 1706 are used in array 1704). Splitter 1714 also is transmissive to most of the light 1712 to transmit the image 1718 on to a third beam splitter 1720, which transmits a portion 1722 on to retroreflectance surface or screen 1730. The splitters 1710, 1714, 1720 may be formed of a similar reflectance material such as common glass or differing reflectance materials may be used in some embodiments (e.g., increasing reflectance along the series such as may be desirable if more than one screen is used to capture reflected light rather than transmitted light).

As shown, the screen 1730 reflects the image 1732 back toward the three beam splitters 1710, 1714, 1720 first striking splitter 1720 where a projected image 1734 is converged at display viewing zone (or image viewing area) 1736 by a viewer 1738 who has positioned his eyes 1739 with one or more of the virtual projectors associated with projectors 1706 to perceive a 3D image 1740 behind the third beam splitter 1720. Light 1744 transmitted through the beam splitter 1720 from screen 1730 is reflected in part shown at 1746 where it converges at a second display viewing zone 1748 to allow a second viewer 1750 to view a perceived 3D image 1756 when he aligns his eyes 1752 with virtual projectors at display viewing zone 1748 corresponding with projectors 1706. Likewise, the portion of light 1760 transmitted through the second beam splitter 1714 is reflected in part by the first beam splitter as shown at 1764 for viewing at display viewing zone/area 1766 by a viewer 1768 who positions his eyes 1769 with virtual projector locations in display viewing zone 1766 to thereby perceive the 3D image 1770 behind the beam splitter 1710. As can be seen in system 1700, the distances between the perceived images and the display viewing zones (or viewers) is substantially equal for each of the view locations. The angle of the splitter relative to the screen (or the display viewing zone) may also be equivalent in some embodiments or vary as shown to place the display viewing zone in a desired location and/or orientation (e.g., the first beam splitter 1710 may be positioned at 45 degrees, the second beam splitter 1714 may be positioned at 50 degrees, and the third beam splitter 1720 may be positioned at 55 to 60 degrees as shown in FIG. 17 as an example but not a limitation).

Figure 18:
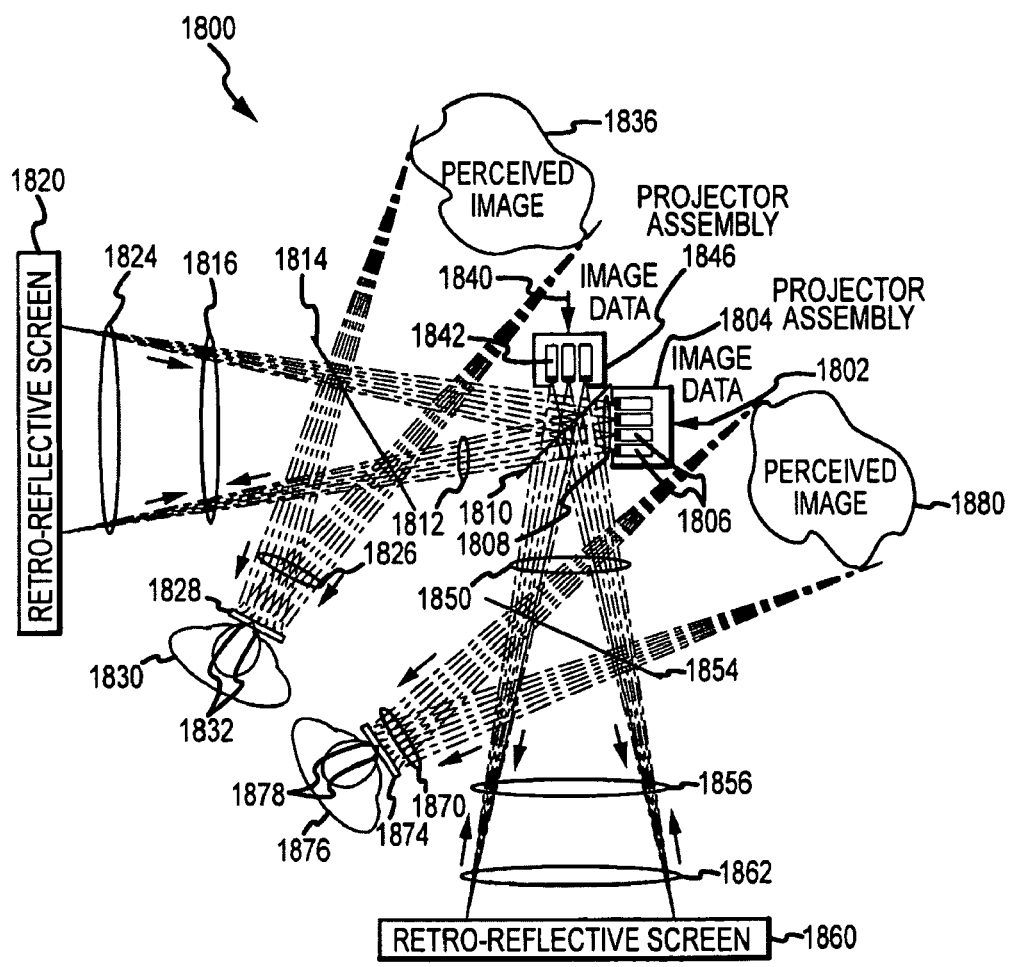

FIG. 18 illustrates yet another 3D projection system 1800 that is arranged to increase the ratio of viewers to hardware. Sometimes it may be desirable to increase the density of the projector lenses to a level greater than allowed by the physical size of the selected projector (e.g., some projectors may not support a desired spacing of at or less than the average human interoccular spacing of about 65 mm). In such a system 1800, a 50 percent beam splitter 1810 may be used to double the effective density of the projectors that may be placed with their outputs or lenses in orthogonal planes with the splitter 1810 extending transverse to such projector outlet planes (e.g., at 45 degrees so as to bisect the angle between such projector outlet planes). Since the system 1800 would be inherently light efficient, the image projection "blow by" that may normally be wasted can be captured and used for a second viewer.

As shown in system 1800, a pair of projector assemblies 1804 are provided that receive as input image data 1802, 1840 and use projectors 1806, 1842 arranged in arrays to output projected images 1808, 1846 toward opposite sides of beam splitter 1810. With proper alignment, the images 1808, 1846 are combined to produce perceived images 1836, 1880. To this end, a first retroreflection screen 1820 is positioned downstream of a beam splitter 1814 to received image streams 1812 that are transmitted through the splitter 1814 as shown at 1816 and that include portions of projected images 1808 transmitted through splitter 1810 and portions of projected images 1846 reflected by splitter 1810. In this manner, the density or projector spacing can be increased such that the image 1816 transmitted to screen 1820 contains images from 7 projectors (in this particular example or an array with 7 projectors per row with more than one row being used in some cases). The screen 1820 reflects with gain light 1824 that is reflected in part as sown at 1826 to be converged at display viewing zone/area 1828 to allow a viewer 1832 with his eyes properly positioned relative to the virtual projector locations at or near display viewing zone 1828 to perceived 3D image 1836 behind the splitter 1814. Similarly, an image stream or wavefront 1850 is generated by light reflected and transmitted by the beam splitter 1810 from projected images 1808 and 1846, respectively. The beam splitter 1854 then is positioned transverse (such as at about 45 degrees) to this stream 1850 to transmit a portion 1856 to a second retroreflective screen 1860, which reflects with gain the projected images 1862 back to the beam splitter 1854. At this point, the light is reflected as shown at 1870 to converge at display viewing zone/area 1874 for viewing by a viewer 1876 with his eyes 1878 positioned near virtual projector locations associated with projectors 1806 and also 1842 to perceive 3D image 1880 behind the splitter 1854.

In some embodiments, as discussed above with reference to FIG. 1, the projected image may be designed so as to be locked or associated with a real object in a display space such as physical props or structures in a room or show set. However, this is not a requirement to practice the invention. An alternative method may provide image streams to the projectors that have a point of view that shifts more rapidly than a viewer's motion would cause or imply. Such a more rapid change in the POV or camera position may produce a greater sense of depth and a greater range of viewing positions for a given display viewing zone. The viewer may even be allowed to look completely around an image (e.g., 360 degrees) by moving back and forth in the X or horizontal direction only in such embodiments.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the input imagery or streams provided to the projectors in the arrays to be pre-recorded or computer-generated real time. In other cases, though, live imagery may be fed from a camera array that matches such as in number of columns or one camera per projector when dual-axis 3D is desired (or is associated but differs in spacing or arrangement). In such a 3D projection system, the cameras may be spaced equal to the projector inter-lens spacing or they may be varied to achieve a desired effect. For example, the camera spacing may be greater than used for the projectors in the arrays so as to give a giant's eye view of the world or a viewed scene or live action. Alternatively, live (or recorded) image streams may be created using camera spacing that is closer than projector spacing to give an ant's eye view of a scene such as live actor or the like.

Video is one convenient way to provide image input for the projectors that have multiple points of view or camera locations that are spaced apart. However, in other embodiments, motion picture film may be used to provide the image input to the projectors in an array. The images may be reduced in magnification and/or spacing in the film (e.g., each frame of the film may include an image for each of the projectors), and then re-imaging may be performed with a film camera or projector with a single or multiple lenses to magnify the images for proper spacing (such as onto a rear-projection screen), which may be followed by multiple projector or projection lenses that project the images toward one or more beam splitters and retroreflection screens as described above for the varied embodiments of projection systems (e.g., with the projection lenses providing magnifying as appropriate). In such embodiments, the images input may be moving or animated but this is not a requirement as it may be desirable to provide a holographic slide projector-type effect with such a 3D projection system.

We claim:

1. An apparatus for projecting or displaying three dimensional (3D) images to a viewer, comprising:
   a projector array comprising a plurality of projectors each receiving an input image and projecting an image based on the input image;
   a beam splitter with first and second surface, wherein the projected images strike the first surface and a portion is transmitted through the beam splitter;
   a screen with a retroreflective surface positioned in the path of the projected images, wherein the transmitted portion is reflected back toward the beam splitter with a gain in brightness to strike and be reflected from the second surface; and
   a viewing zone positioned proximate to a set of focal points for images reflected from the second surface of the beam splitter, wherein a 3D image is perceivable to a viewer that positions his eyes at a viewing location proximate to the viewing zone,
   wherein the projector array comprises at least one row of the projectors, wherein the projectors are arranged in the row with a separation distance between each pair of adjacent lenses of the projectors of less than about 70 millimeters, and wherein the image input provided to the projectors in the row correspond to a number of points of view, the points of view being spaced apart from each other and the number of projectors being equal to the number of the points of view.

2. The apparatus of claim 1, wherein the retroreflective surface is substantially planar and is positioned a throw distance of at least about 8 feet from the projectors and substantially parallel to a plane containing lenses of the projectors.

3. The apparatus of claim 2, wherein the gain in brightness provided by the retroreflective surface is at least about 1000 times.

4. The apparatus of claim 3, wherein the beam splitter is at least about 50 percent transmissive to light.

5. The apparatus of claim 2, wherein the beam splitter is substantially planar and is positioned at an angle relative to the retroreflective surface selected from the range of about 30 to about 60 degrees.

6. The apparatus of claim 1, wherein the points of view correspond to a plurality of cameras arranged in an array and wherein each of the cameras is associated with one of the projectors, whereby images captured by a particular camera are fed to a particular projector among the plurality of projectors.

7. The apparatus of claim 1, wherein the projector array comprises two or more of the rows of the projectors and wherein adjacent pairs of projection lenses of the projectors within a column of the projector array are spaced apart by about the separation distance.

8. The apparatus of claim 1, wherein the input images each comprises a digital video stream provided from a data storage medium.

9. The apparatus of claim 1, wherein the input images each comprises a real time feed of a digital image from a camera array placed in a unique camera location and wherein the cameras all focus upon a shared subject.

10. The apparatus of claim 1, wherein the 3D image is perceivable to the viewer with his eyes in two or more viewing locations associated with the display viewing zone, whereby the viewer can move and align his eyes with differing pairs of virtual projector locations associated with the projectors of the projector array.

11. An autostereoscopic projection system, comprising:
    means for providing a plurality of image inputs;
    means for projecting an image for each of the image inputs; and
    means for directing the projected images to a display viewing zone with a plurality of viewing locations at which a viewer may view a 3D image from differing points of view,
    wherein the projecting means comprises a plurality of projectors arranged in two or more adjacent rows the projectors being positioned with projection lenses of adjacent ones of the projectors in the rows and in columns spaced apart a projector separation distance of less than about 70 mm.

12. The system of claim 11, wherein the plurality of image inputs comprises digital video corresponding to a plurality of camera locations.

13. The system of claim 11, wherein the directing means comprises a retroreflective screen positioned transverse to a path of the projected images and a beam splitter that is at least 50 percent transmissive positioned between the projecting means and the retroreflective screen and places at an angle relative to the retroreflective screen of less than about 60 degrees, whereby a surface of the beam splitter proximate to the retroreflective screen reflects the projected images traveling from the retroreflective screen to the projection area.

14. The system of claim 11, wherein the directing means comprises a beam splitter reflecting the projected images onto a retroreflective surface and being transmissive to light reflected from the retroreflective surface to direct the transmitted light to the projection area.

15. The system of claim 11, wherein the projecting means comprises means associated with each of the projectors for splitting the projected image into two or more images that are output in parallel paths.

16. The system of claim 11, further comprising an additional display viewing zone and wherein the directing means comprises two or more beam splitters each transmitting a portion of the projected image onto a retroreflective screen and each reflecting light reflected from the retroreflective screen into one of the display viewing zones and the additional display viewing zone, whereby the viewer and an additional viewer may concurrently view the 3D image.

17. An autostereoscopic projection method comprising:
    providing a retroreflective surface and a beam splitter that is positioned at an angle relative to the retroreflective surface;
    capturing images of a subject with one or more cameras positioned at an array of at leas three camera locations; and
    projecting the captured images toward the beam splitter from projection lenses arranged in an array corresponding to the array of camera locations and being equal in number to the camera locations, wherein adjacent pairs of the projection lenses are spaced apart less than about 70 mm and wherein the projected images are transmitted through the beam splitter onto the retroreflective surface and then are reflected off the beam splitter, after being reflected back from the retroreflective surface with a gain in illumination level, towards a display viewing zone to display a 3D image to a viewer viewing a pair of the reflected images.

18. The method of claim 17, wherein the beam splitter angle is about 45 degrees and the gain in the illumination level is at least about 1000 times.

19. The method of claim 17, wherein the beam splitter comprises glass with a transmissivity to light of at least about 50 percent.

20. The method of claim 17, wherein the projection lenses are lenses provided in projectors, the array includes two or more rows with three or more of the projectors in each row, and the projectors have output illumination levels of less than about 10 lumens.

21. The method of claim 17, wherein the adjacent pairs of the projection lenses are spaced apart a distance less than about 60 mm and the retroreflective surface is spaced at least 10 feet from the projection lenses.

* * * * *

UNITED STATES PATENT AND TRADEMARK OFFICE
CERTIFICATE OF CORRECTION

| | | |
|---|---|---|
| PATENT NO. | : 7,938,540 B2 | Page 1 of 1 |
| APPLICATION NO. | : 12/176947 | |
| DATED | : May 10, 2011 | |
| INVENTOR(S) | : Brentnall, III et al. | |

It is certified that error appears in the above-identified patent and that said Letters Patent is hereby corrected as shown below:

At Col. 22, line 9, after "rows" insert a --,--.

At Col. 22, line 50, delete "leas" and insert therefor --least--.

Signed and Sealed this

Fourteenth Day of June, 2011

David J. Kappos
*Director of the United States Patent and Trademark Office*